US011778413B2

(12) United States Patent
Kavaler et al.

(10) Patent No.: US 11,778,413 B2
(45) Date of Patent: Oct. 3, 2023

(54) APPARATUS AND LOCALE-BASED METHOD FOR THWARTING DECEPTIONS AND/OR DENIAL OF SERVICES

(71) Applicant: Sensys Networks, Inc., Berkeley, CA (US)

(72) Inventors: Robert Kavaler, Kensington, CA (US); Sophia Haoui, Berkeley, CA (US); Todd Stiers, Berkeley, CA (US)

(73) Assignee: Sensys Networks, Inc., Berkeley, CA (US)

( * ) Notice: Subject to any disclaimer, the term of this patent is extended or adjusted under 35 U.S.C. 154(b) by 14 days.

(21) Appl. No.: 17/495,680

(22) Filed: Oct. 6, 2021

(65) Prior Publication Data

US 2022/0022002 A1    Jan. 20, 2022

Related U.S. Application Data

(63) Continuation of application No. 17/043,650, filed as application No. PCT/US2020/047570 on Aug. 24, 2020, which is a continuation-in-part of application No. 16/800,607, filed on Feb. 25, 2020, now Pat. No. 10,873,859.

(60) Provisional application No. 62/963,986, filed on Jan. 21, 2020.

(51) Int. Cl.
| | |
|---|---|
| *H04W 4/02* | (2018.01) |
| *H04L 9/08* | (2006.01) |
| *H04L 9/40* | (2022.01) |
| *H04W 4/80* | (2018.01) |
| *H04L 51/58* | (2022.01) |

(52) U.S. Cl.
CPC ............ *H04W 4/02* (2013.01); *H04L 9/0844* (2013.01); *H04L 51/58* (2022.05); *H04L 63/0807* (2013.01); *H04W 4/80* (2018.02)

(58) Field of Classification Search
CPC ........ H04W 4/021; H04W 4/023; H04W 8/16
USPC ...................................................... 455/404.2
See application file for complete search history.

(56) References Cited

U.S. PATENT DOCUMENTS

| | | |
|---|---|---|
| 8,341,397 B2 | 12/2012 | Leedom |
| 8,732,459 B2 | 5/2014 | Leedom |
| 9,686,676 B2 | 6/2017 | Palin |
| 9,769,664 B1 | 9/2017 | Kavaler |
| 10,652,734 B2 | 5/2020 | Leedom |

(Continued)

FOREIGN PATENT DOCUMENTS

| | | |
|---|---|---|
| KR | 10-2017-0035294 | 3/2017 |
| WO | WO2017-035138 | 3/2017 |

*Primary Examiner* — Qutbuddin Ghulamali
(74) *Attorney, Agent, or Firm* — Earle Jennings

(57) ABSTRACT

Technical problems and their solution are disclosed regarding the location of mobile devices requesting services near a site from a server. Embodiments adapt and/or configure the transmitting device near the site, the mobile device communicating with the transmitting device using a short haul wireless communications protocol to deliver a token based upon a key shared with the server but invisible to the mobile device. The server can determine the proximity of the mobile device to the site to control actuation of the requested service or disable the service request, and possibly flushing the service request from the server. Solutions are disclosed for traffic intersections involving one or more traffic lights, elevators in buildings, fire alarms in buildings and valet parking facilities.

15 Claims, 22 Drawing Sheets

(56) References Cited

U.S. PATENT DOCUMENTS

| | | |
|---|---|---|
| 2008/0022089 A1 | 1/2008 | Leedom |
| 2013/0159705 A1 | 6/2013 | Leedom |
| 2016/0212147 A1 | 7/2016 | Palin |
| 2016/0212194 A1 | 7/2016 | Palin |
| 2017/0078288 A1* | 3/2017 | Wu .................... H04L 63/0807 |
| 2017/0083882 A1 | 3/2017 | Kim et al. |
| 2017/0171750 A1 | 6/2017 | Leedom |
| 2017/0372600 A1 | 12/2017 | Palin |
| 2018/0338241 A1 | 11/2018 | Li |
| 2019/0332787 A1* | 10/2019 | Graf ........................ G06F 16/95 |
| 2019/0361694 A1 | 11/2019 | Gordon et al. |
| 2019/0362064 A1* | 11/2019 | Zhang .................... G06F 21/35 |
| 2020/0134953 A1* | 4/2020 | Li ............................ G07C 9/22 |

* cited by examiner

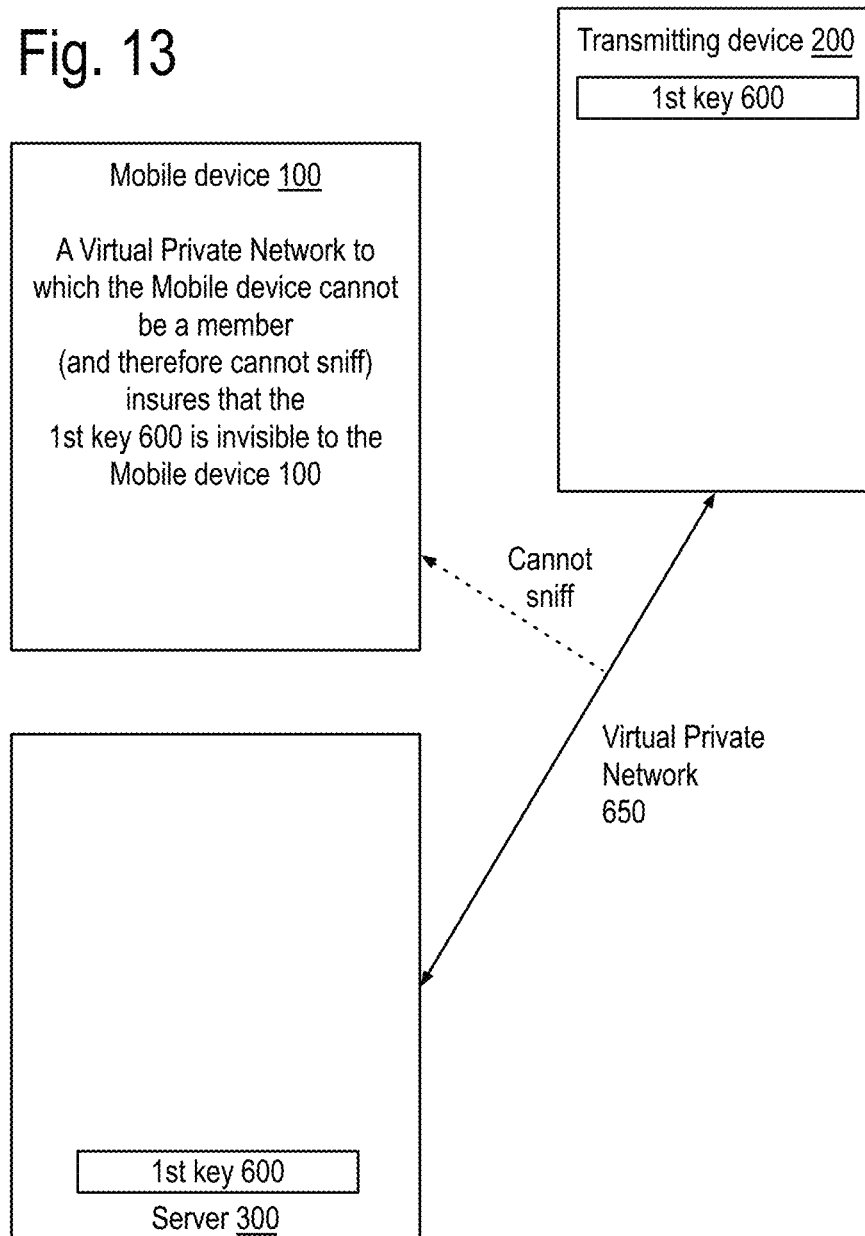

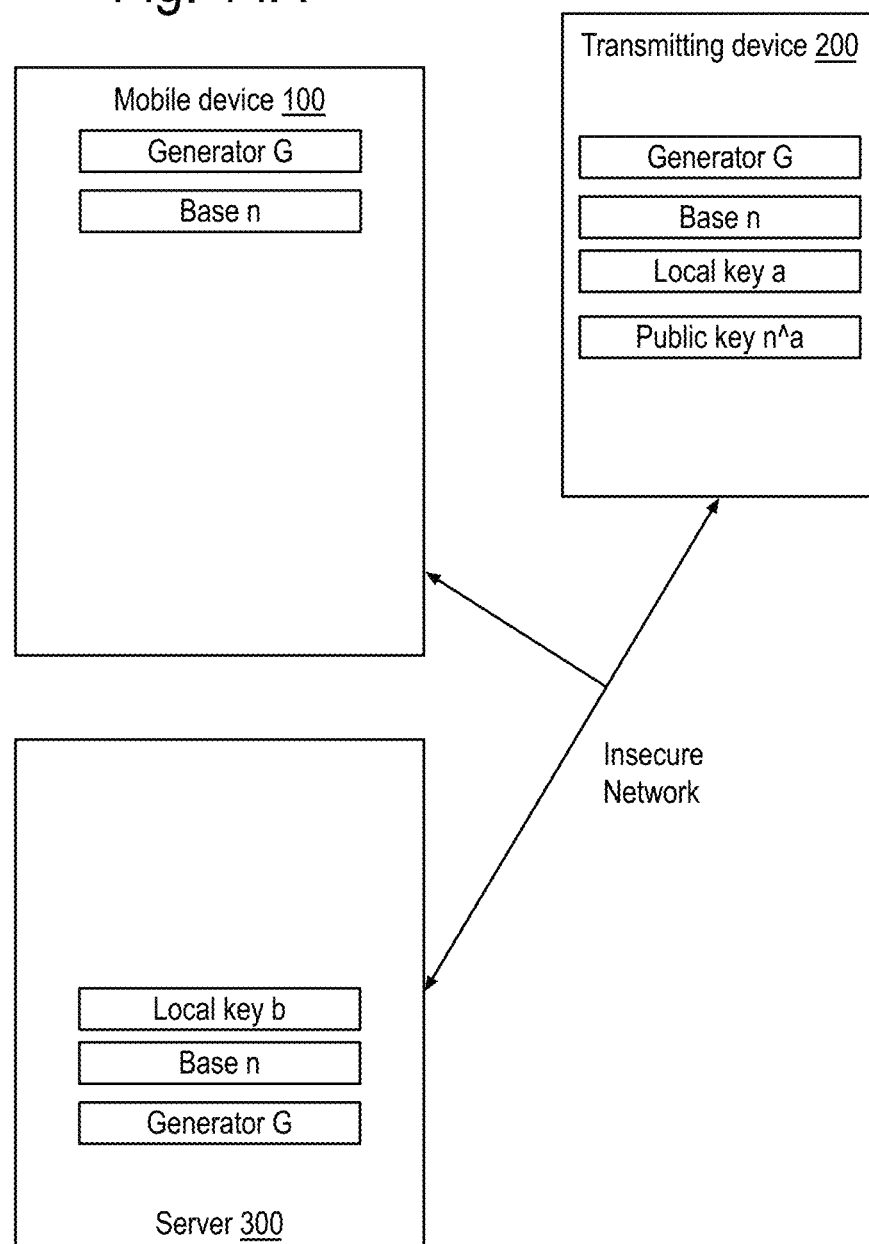

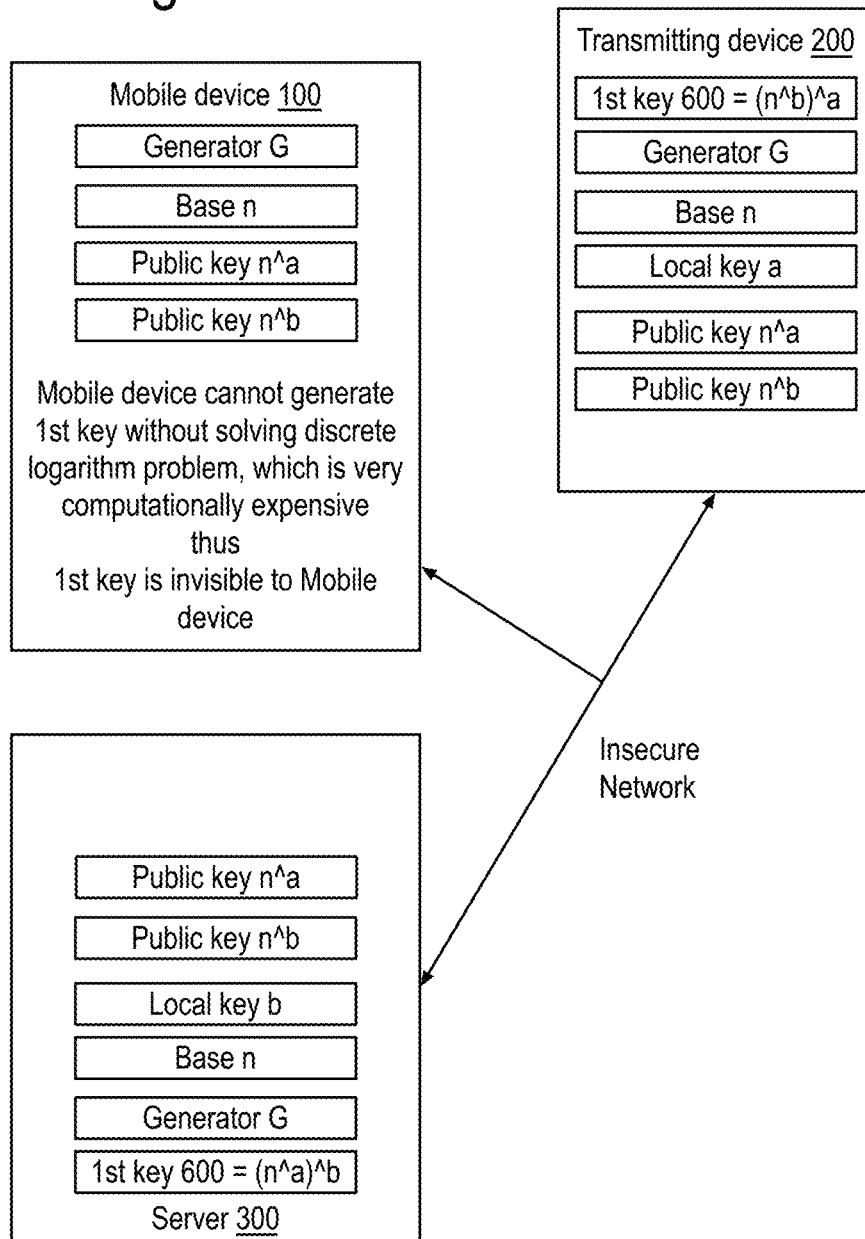

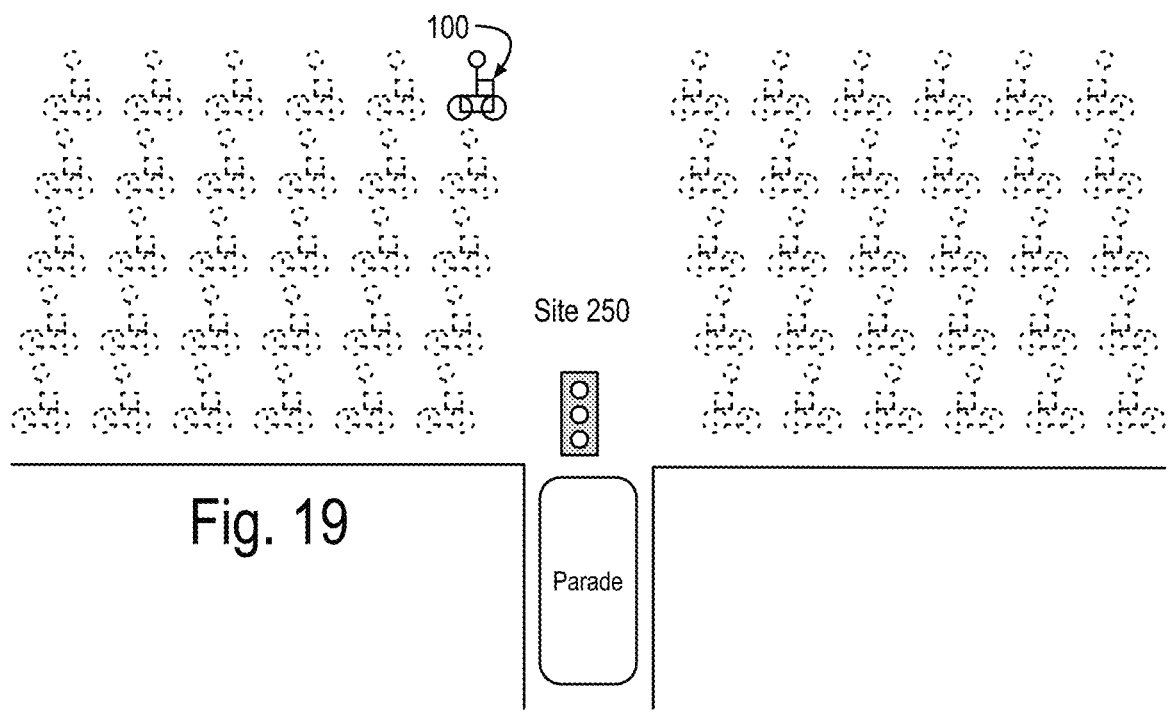
Fig. 19
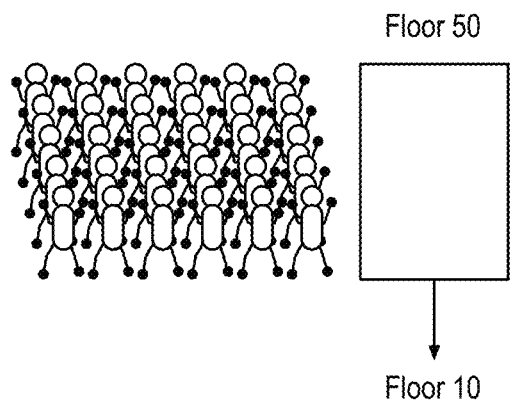
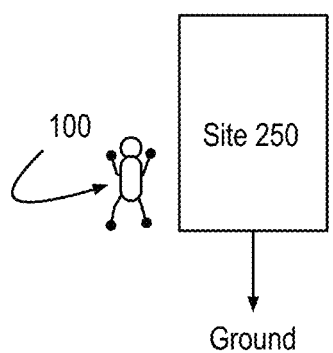
Fig. 20

APPARATUS AND LOCALE-BASED METHOD FOR THWARTING DECEPTIONS AND/OR DENIAL OF SERVICES

TECHNICAL FIELD

Technical problems and their solution are disclosed regarding the location of mobile devices requesting services near a site from a server. Embodiments adapt and/or configure the transmitting device near the site, the mobile device communicating with the transmitting device using a short haul wireless communications protocol to deliver a token based upon a key shared with the server but invisible to the mobile device. The server can determine the proximity of the mobile device to the site to control actuation of the requested service or disable the service request, and possibly flushing the service request from the server.

BACKGROUND OF THE INVENTION

The inventors have found a new class of technical problems which is discussed in the summary of the invention.

SUMMARY OF THE INVENTION

The inventors have discovered two inter-related questionable situations, with technical problems associated with each.
- First, how does a server know that a user of a mobile device is where they, or their mobile device claim them to be?
- Second, how does the server weed through bogus requests to find one or more real requests to use a localized service, such as a traffic light, an elevator, enter a building and so on?

Today, internet denial of service attacks are well known and understood regarding internet service provider systems. However, location-based denial of service attacks are not well known or understood. The inventors came across this technical form of attack by performing a simple experiment on a wireless sensor system. This is a new technical problem which can affect a wide cross section of sensor and actuator systems frequently found in cities, industrial complexes, warehouses, road way systems, and farms. This technical problem will be shown through examples of traffic lights at intersections, elevators in a high-rise building and automated requests to a valet system in a car parking facility. The example situations range from mild inconveniences to potentially life-threatening diminishment of services during an emergency, such as a real or spoofed fire in a high-rise building.

Consider a first example shown in FIG. 1A and FIG. 1B, a parade is scheduled to proceed across multiple lanes of a roadway and approaches an intersection. Suppose some bad actor wants to slow down the parade by impersonating bicyclists waiting at the intersection as shown in FIG. 1A, through the abuse of several cell phones operating traffic applications intended to recognize the cell phone users as bicyclists at the intersection. If the traffic control system cannot tell if the cell phones are actually there as revealed in FIG. 1B, the parade may be disrupted.

Consider a second example, it is an end of shift time for workers (people) on an upper floor in a high-rise building as shown in FIG. 2A. Suppose some bad actor wants to slow or impede the workers (people) going off-shift through the abuse of cell phones requesting elevator service between lower floors as revealed in FIG. 2B. These fake requests may slow down and impede the going-off-shift workers (people) from leaving the high-rise building.

Consider a third example, suppose some bad actor operates a mobile device to initiate a fire alert on a lower floor while the workers (people) on the upper floor are leaving the building at the end of their shift in FIG. 2C. This could be taken through several steps, including the impersonation of a mobile device associated with a security person for the building. These disruptive steps could have a large effect on multiple individuals and businesses in and around the building, as well as first responders and other emergency personnel. What is needed are devices and methods of their operation first shown in FIG. 2D, which can recognize a bad actor, and disregard the false alarms shown in FIG. 2C.

Consider a fourth example, in which customers of a valet parking facility can request their cars through an application on their mobile devices. Suppose a bad actor impersonates a large number of these customer mobile devices, requesting that their vehicles be made ready for their use, overwhelming the valet service mechanism's ability to recognize and service the actual customer requests as shown in FIG. 2E. Again, what is needed are devices and methods of their operation first shown in FIG. 2F, which can recognize a bad actor, and disregard the false requests shown in FIG. 2E.

The inventors have solved the technical problems of validating the location of mobile devices near a site where one or more service may be requested. This invention, in its various embodiments, renders the determination of which mobile device is near a site deterministic, in effect contributing to at least partial, and in many instances, complete technical solution to these and many similar problems which may inflict harm and/or inconvenience upon lawful, cooperative inhabitants of our cities, industries, highways, and farms. It encompasses implementations which make "spoofing" the location of a mobile device difficult, and in a number of situations nearly impossible.

One embodiment is implemented as apparatus including a mobile device 100, a transmitting device 200 and a server 300 as shown in FIG. 3 to FIG. 14D. The server 300 and the transmitting device 200 share a first key 600 they each independently use based upon an token generator 610. The first key 600 is invisible to any of the mobile devices 100 which may request a service 500 that is performed no more than a third distance 510 from site 200. The invention may further operate as follows:

The transmitting device 200 generates a token 220 using the first key 600 and the token generator 610 and generates a wireless message 230 including the token 220. The transmitting device may include a short-haul transmitter to send the wireless message 230. The mobile device 200 includes a short-haul receiver 140 to receive the wireless message 230 as a received wireless message 130 when, and only when, mobile device 200 is within a first distance 110 of the transmitting device 200.

The mobile device 100 responds to the received wireless message 130 by parsing the wireless message to generate the token 220 without wireless communicating to the transmitting device 200. The mobile device sends a service request to the server to perform a service at the site. The mobile device sends a message to the server including a form of the token to confirm the mobile device is no more than the first distance from the transmitting device.

BRIEF DESCRIPTION OF THE DRAWINGS

FIG. 13 shows a first example of the distribution of the first key of the previous drawings to the transmitting device and the server which is invisible to the mobile device;

FIG. 14A, FIG. 14B, FIG. 14C, and FIG. 14D show a second example of the distribution of the first key of the previous drawings to the transmitting device and the server which is invisible to the mobile device;

FIG. 19 shows the solution to the technical problem discussed regarding FIG. 1A and FIG. 1B;

FIG. 20 shows the solution to the technical problem discussed regarding FIG. 2A and FIG. 2B;

DETAILED DESCRIPTION OF THE INVENTION

The inventors have discovered two technical problems with associated, inter-related questionable situations.

First, how does a server 300 know that a user of a mobile device 100 is where they, or their mobile device claim them to be?

Second, how does the server 300 weed through bogus requests to find one or more real requests to use a localized service 500, such as a traffic light, an elevator, enter a building and so on?

Today, internet denial of service attacks are well known and understood regarding internet service provider systems. However, location-based denial of service attacks are not well known or understood. The inventors came across this technical form of attack by performing a simple experiment on a wireless sensor system. This is a new technical problem which can affect a wide cross section of sensor and actuator systems frequently found in cities, industrial complexes, warehouses, and road way systems, and farms. This technical problem will be shown through examples involving traffic lights at intersections, elevators in a high-rise building and automated requests to a valet system in a car parking facility. The example situations range from mild inconveniences to potentially life-threatening diminishment of services during an emergency, such as a real or spoofed fire in a high-rise building.

Figure 1A:
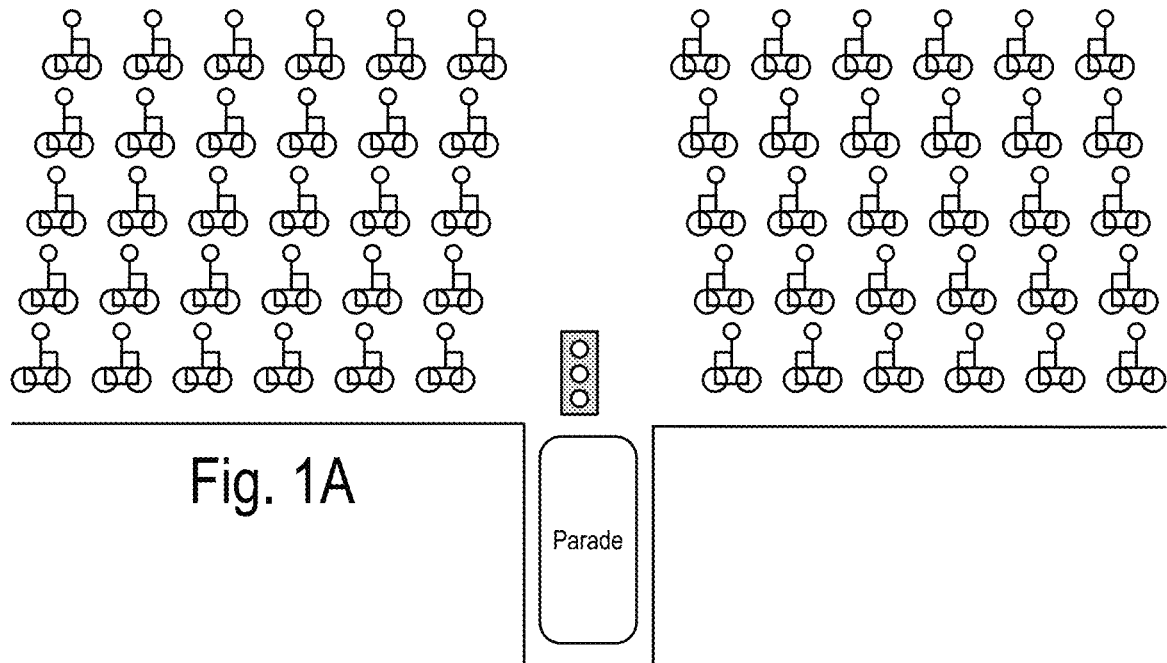
FIG. 1A and FIG. 1B show an example of a parade scheduled to cross an intersection, which a bad actor can delay and/or disrupt by spoofing the location of a large number of bicycles. These drawings also show the potential deleterious effects of many fake requests persisting in a server's memory, potentially causing server malfunctions.
Figure 1B:
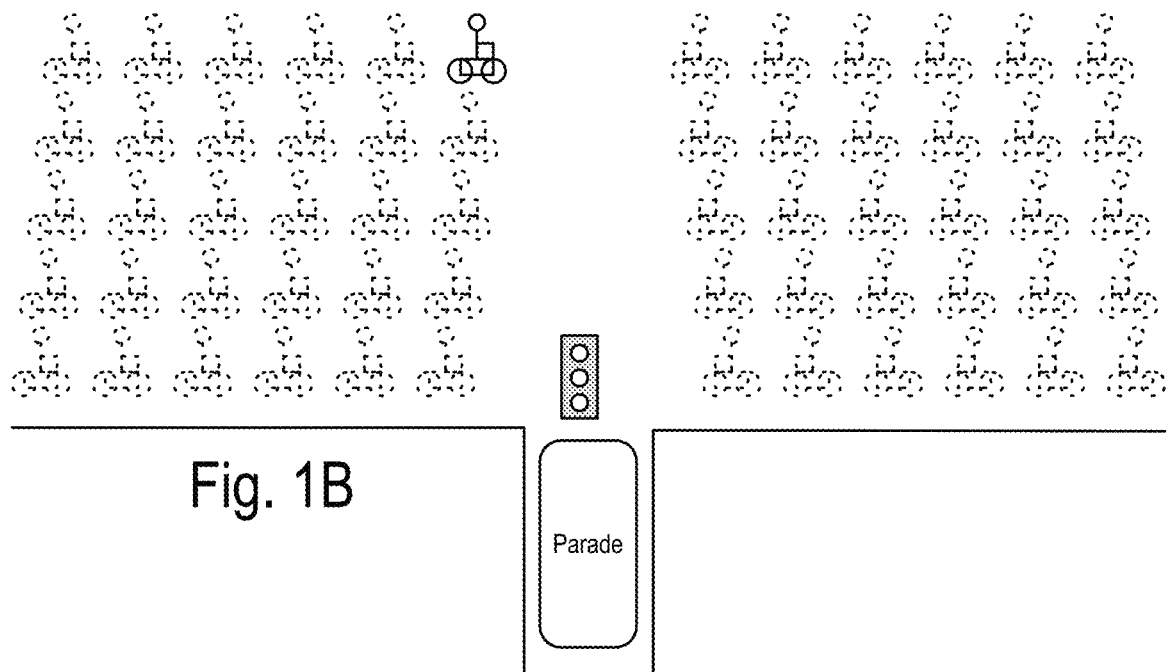

Consider a first example shown in FIG. 1A and FIG. 1B, a parade is scheduled to proceed across multiple lanes of a roadway and approaches an intersection. Suppose some bad actor wants to slow down the parade by impersonating bicyclists waiting at the intersection as shown in FIG. 1A, through the abuse of several cell phones operating traffic applications intended to recognize the cell phone users as bicyclists at the intersection. If the traffic control system cannot tell if the cell phones are actually there as revealed in FIG. 1B, the parade may be disrupted.

Figure 2A:
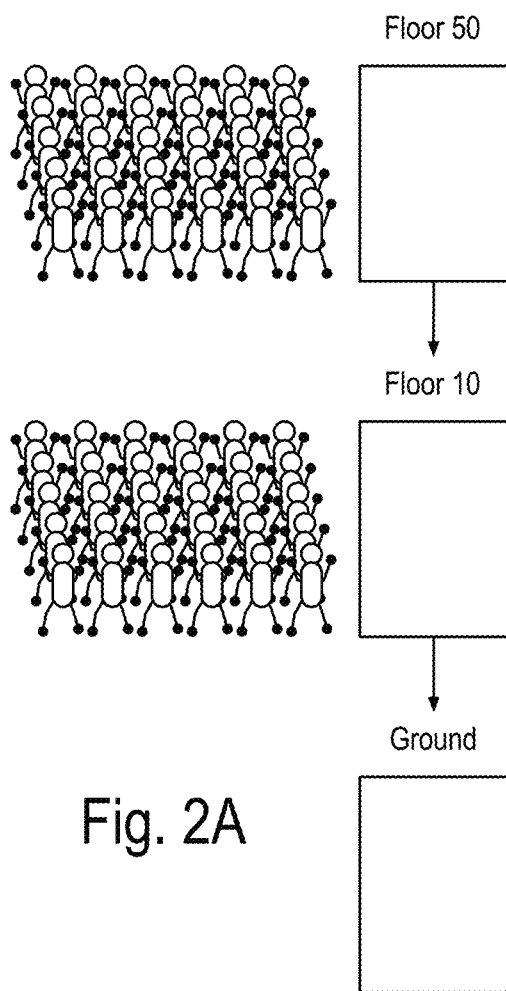
FIG. 2A and FIG. 2B show an example of a large number of people requesting elevator service from the 50$^{th}$ floor of a high-rise building, which a bad actor may delay and/or disrupt by spoofing the location of a large number of other people.
Figure 2B:
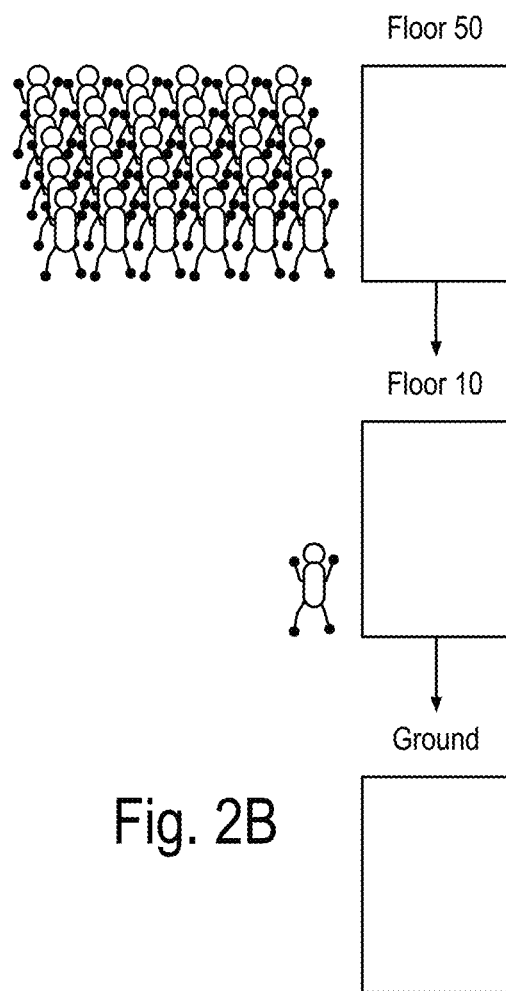

Consider a second example, it is an end of shift time for workers, more generally, people on an upper floor in a high-rise building as shown in FIG. 2A. Suppose some bad actor wants to slow or impede the workers going off-shift through the abuse of cell phones 800 requesting elevator service between lower floors as revealed in FIG. 2B. These fake requests may slow down and impede the going-off-shift workers from leaving the high-rise building. Worse yet, the fake requests could potentially flood the server 300, potentially causing it to malfunction. To avoid this further technical problem, the server 300 needs to remove the fake requests from its pending request queue(s) as shown in FIG. 2B.

Consider a third example. Suppose a bad actor operates a mobile device to initiate a fire alert on a lower floor while the (people) on an upper floor are leaving the building as shown in FIG. 2D. This could include impersonation of a mobile device associated with a security person for the building, giving the impression shown in FIG. 2C of an actual fire alert. These disruptive steps could have a large effect on multiple individuals and businesses in and around the building, as well as first responders and other emergency personnel.

Consider a fourth example, in which customers of a valet parking facility can request their cars through an application on their mobile devices. Suppose a bad actor impersonates a large number of these customer mobile devices, requesting that their vehicles be made ready for their use, overwhelming the valet service mechanism's ability to recognize and service the actual customer requests as shown in FIG. 2E. FIG. 2F shows the actual situation, which many fewer requests are being made and the delivered vehicles do not overwhelm the delivery site.

The inventors have solved the technical problems of validating the location of mobile devices 100 near a site 250 where one or more site related service 500 is requested. This invention, in its various embodiments, renders the determination of which mobile device 100 is near the site 250 deterministic, in effect contributing to at least partial, and in many instances, complete technical solution to these and many similar problems which may inflict harm and/or inconvenience upon lawful, cooperative inhabitants of our cities, industries, highways, and farms. It encompasses implementations which make "spoofing" the location of a mobile device 100 difficult, and in a number of situations nearly impossible.

Figure 3:
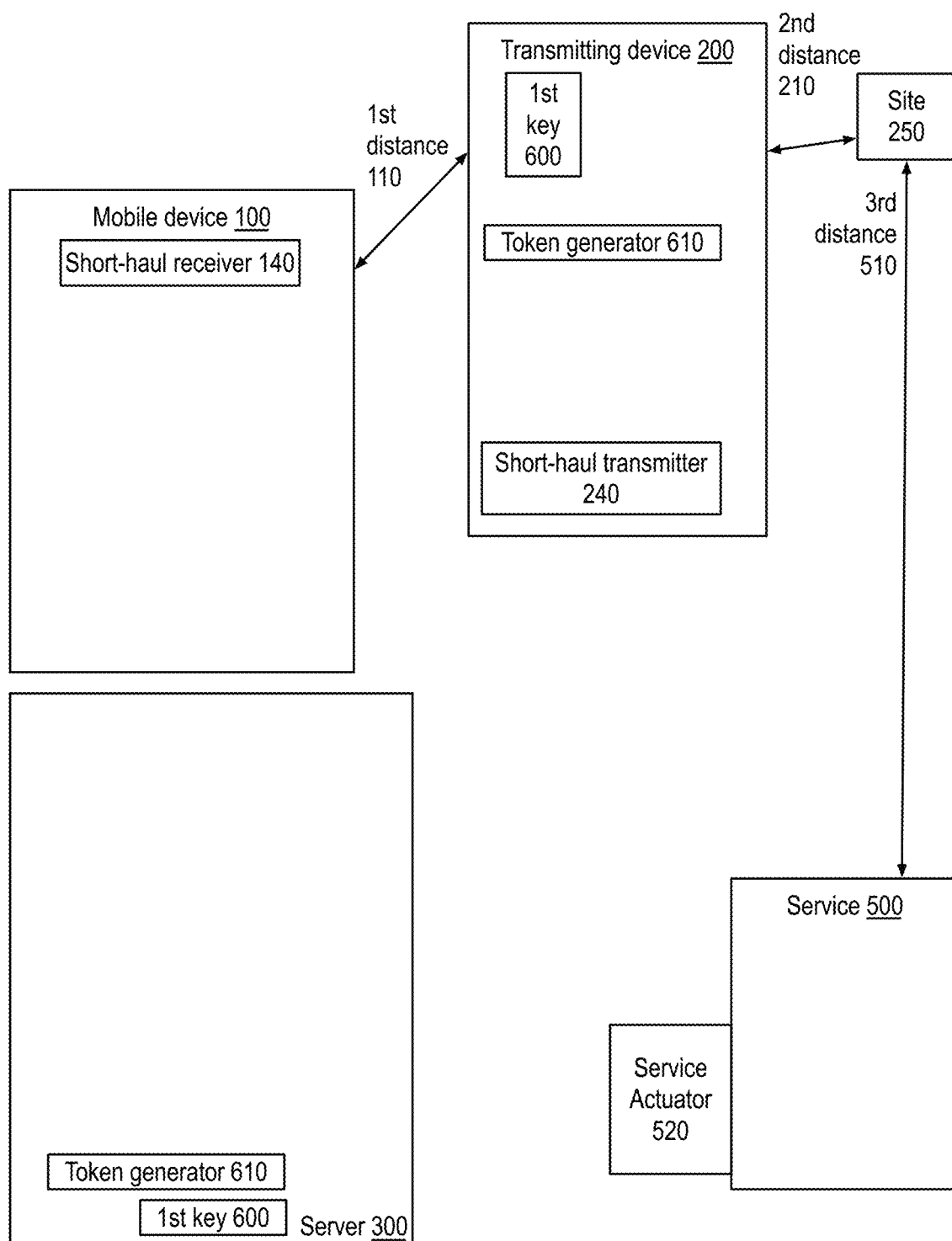
FIG. 3, FIG. 4, FIG. 5, FIG. 6, FIG. 7, FIG. 8, FIG. 9, FIG. 10, FIG. 11, FIG. 12A, and FIG. 12B show some examples of the apparatus and their interactions in accord with the invention.

FIG. 3 shows a basic schematic of one embodiment is implemented as apparatus including a mobile device 100, a transmitting device 200 at no more than a second distance 210 from a site 250 and a server 300. The server 300 and the transmitting device 200 share a first key 600 they each independently use based upon a token generator 610. The first key 600 is invisible to any of the mobile devices 100 which may request a service 500 that is performed no more than a third distance 510 from site 200. In some implementations, the token generator 610 may implement a form of a secure hash algorithm of the first key 600 to generate a token 220 shown in subsequent drawings, or alternatively, implement an encryption algorithm of the first key to generate the token 220.

Figure 4:
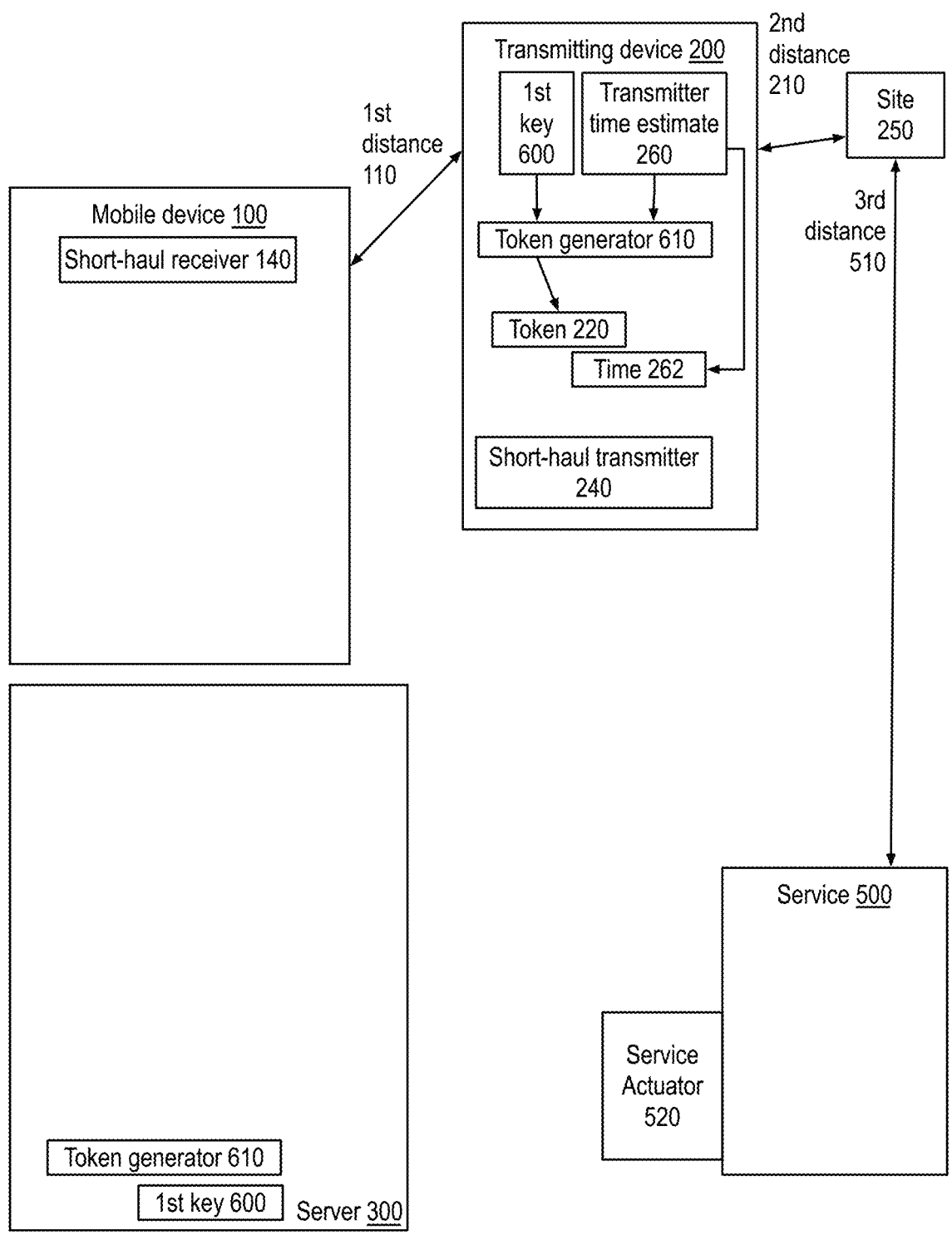

FIG. 4 shows a progression from FIG. 3 wherein the transmitting device 200 generates a transmitter time estimate 260. The first key 600 and the transmitter time estimate 260 stimulate the token generator 610 to generate the token 220. The transmitter time estimate 260 also stimulates the generation of a transmitter time component 262. In some implementations, the transmitter time component 262 represents a selection of some of the bits of the transmitter time estimate 260. In some implementations, the transmitter time component 262 may be implemented as an offset from some observed time event, such as a timing synchronization message.

Figure 5:
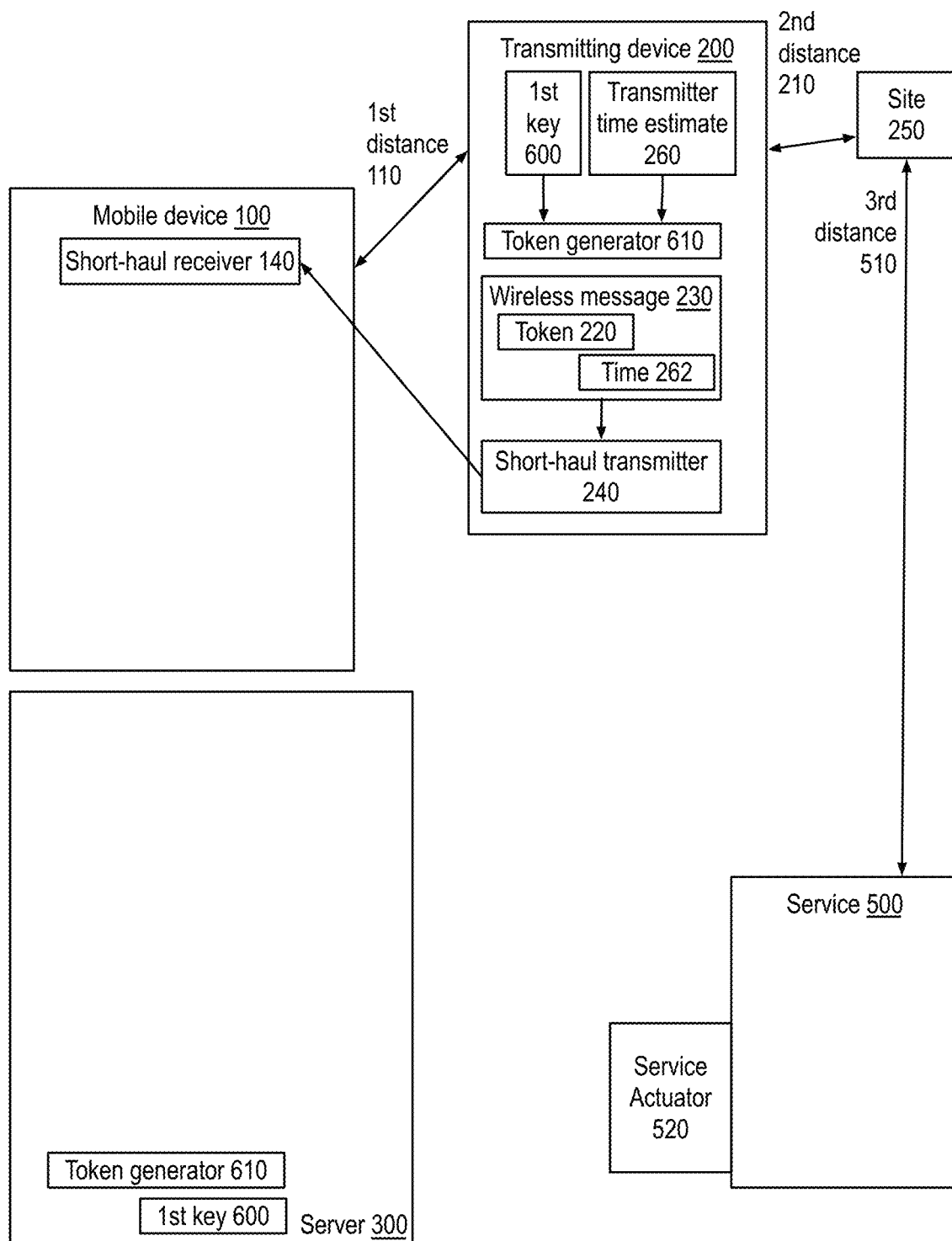

FIG. 5 shows a progression from FIG. 4 wherein the transmitting device 200 packages the token 220 and the transmitter time component 262 into at least part of the data payload of a wireless message 230. Note that the wireless message 230 may also include message type and/or error control components which may not be part of the data payload.

Figure 15:
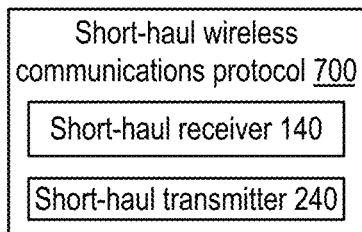
FIG. 15 shows the short haul receiver included in the mobile device and the short haul transmitter included in the transmitting device of previous drawings to be compliant with a short-haul wireless protocol.
Figure 16A:
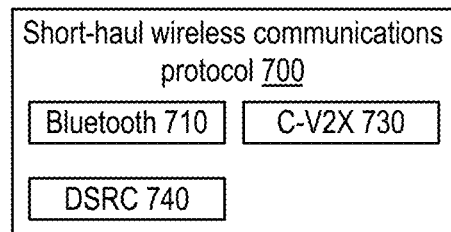
FIG. 16A shows some examples of short-haul wireless communications protocols of FIG. 15.
Figure 16B:
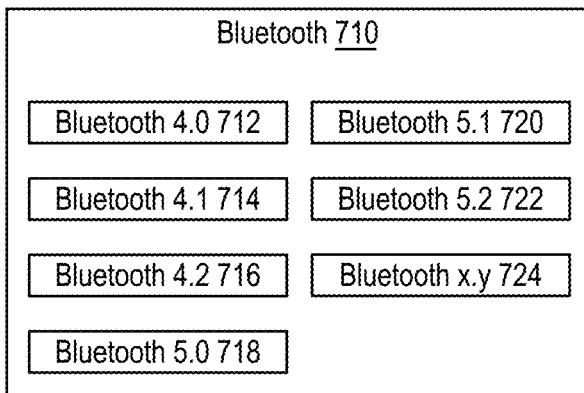
FIG. 16B shows some examples of versions of the Bluetooth of FIG. 16A.

By way of example, suppose the short-haul receiver 140 of the mobile device 100 and the short-haul transmitter 240 of the transmitting device 200 are compliant with a short-haul wireless communication protocol 700 as shown in FIG. 15. Further, suppose the short-haul communications protocol 700 is a version of Bluetooth 710 as shown in FIG. 16A, and that the version of Bluetooth is at least Bluetooth 4.0 712 as shown in FIG. 16B. In this example, the message type of the wireless message 230 of FIG. 5 may be an advertisement, which does not require a dialog with the mobile device 100 for its short-haul receiver 140 to receive the wireless message 230 from the short-haul transmitter 240 of the transmitting device 200.

Figure 6:
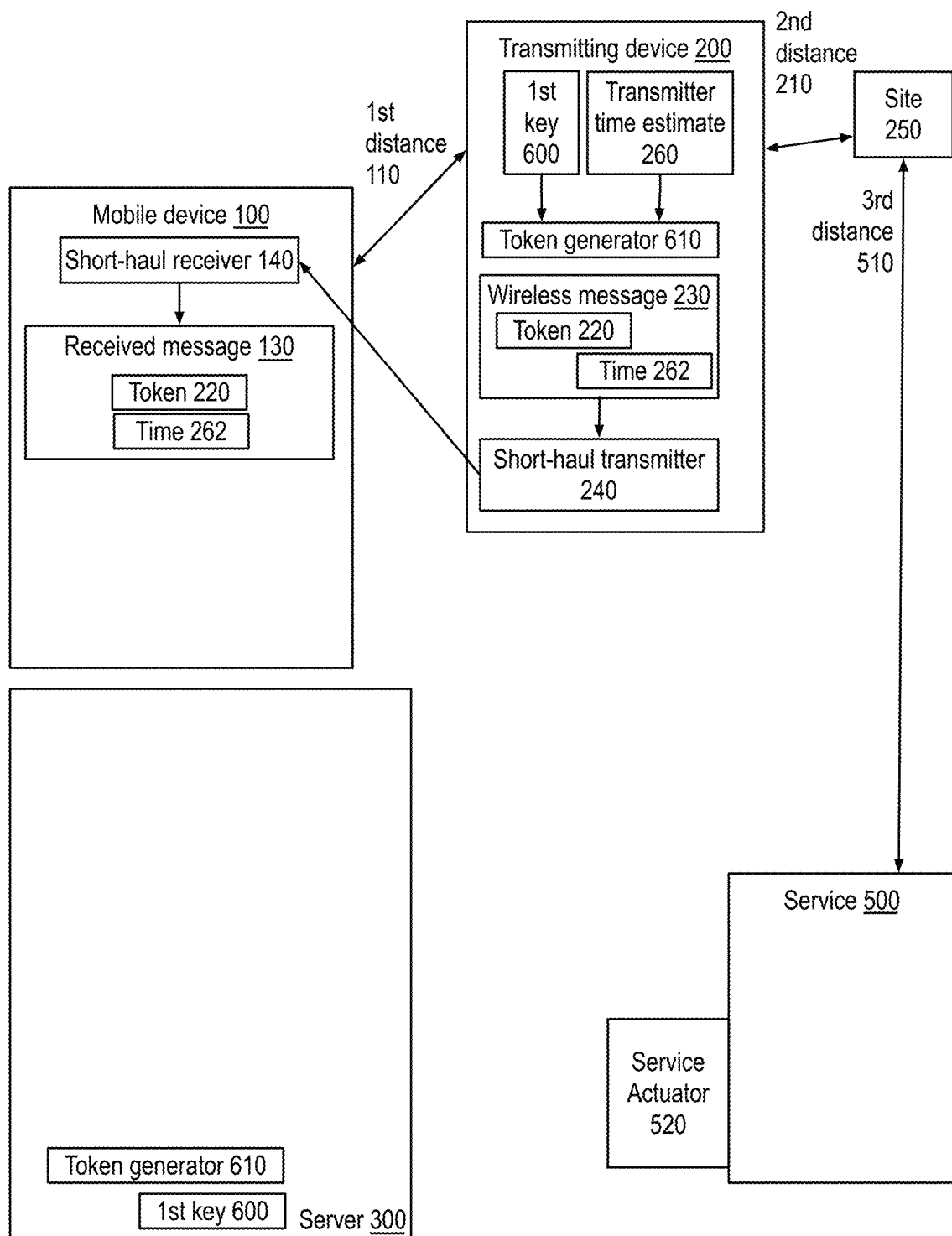

FIG. 6 shows a progression from FIG. 5 wherein the mobile device responds to the sending of the wireless message 230 from the short-haul transmitter 240 of the transmitting device 200, which is received by the short-haul receiver 140 to generate the received message 130. The received message 130 contains a data payload including the token 220 and the transmitter time component 262.

Figure 7:
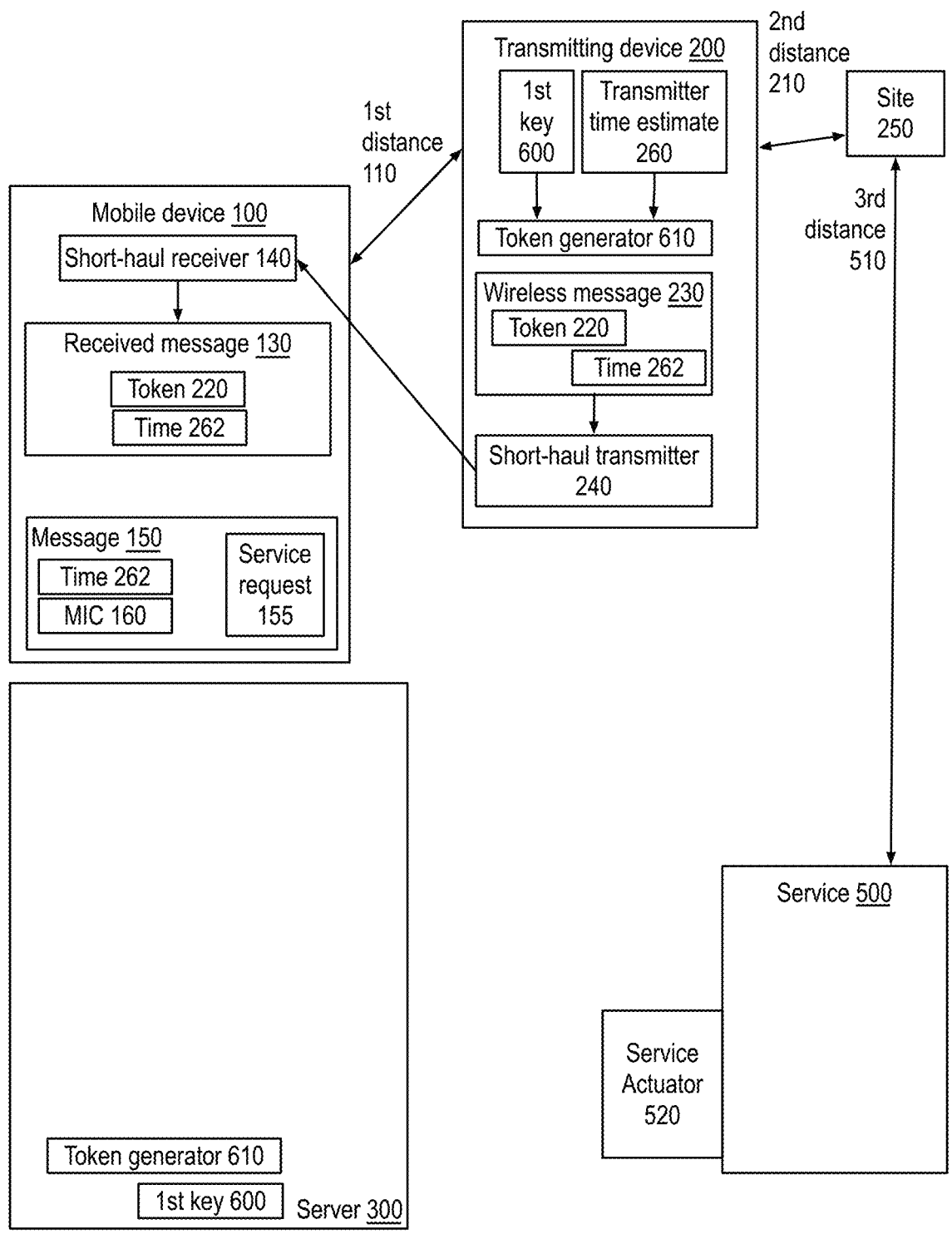

FIG. 7 shows a progression from FIG. 6 wherein the mobile device 100 responds to the received message 130 to generate a message 150 containing a data payload including the transmitter time component 262, a service request 155 and a Message Integrity Check (MIC) 160. The MIC 160 may be generated from the token 220, the transmitter time component 262 and the service request 155.

Figure 8:
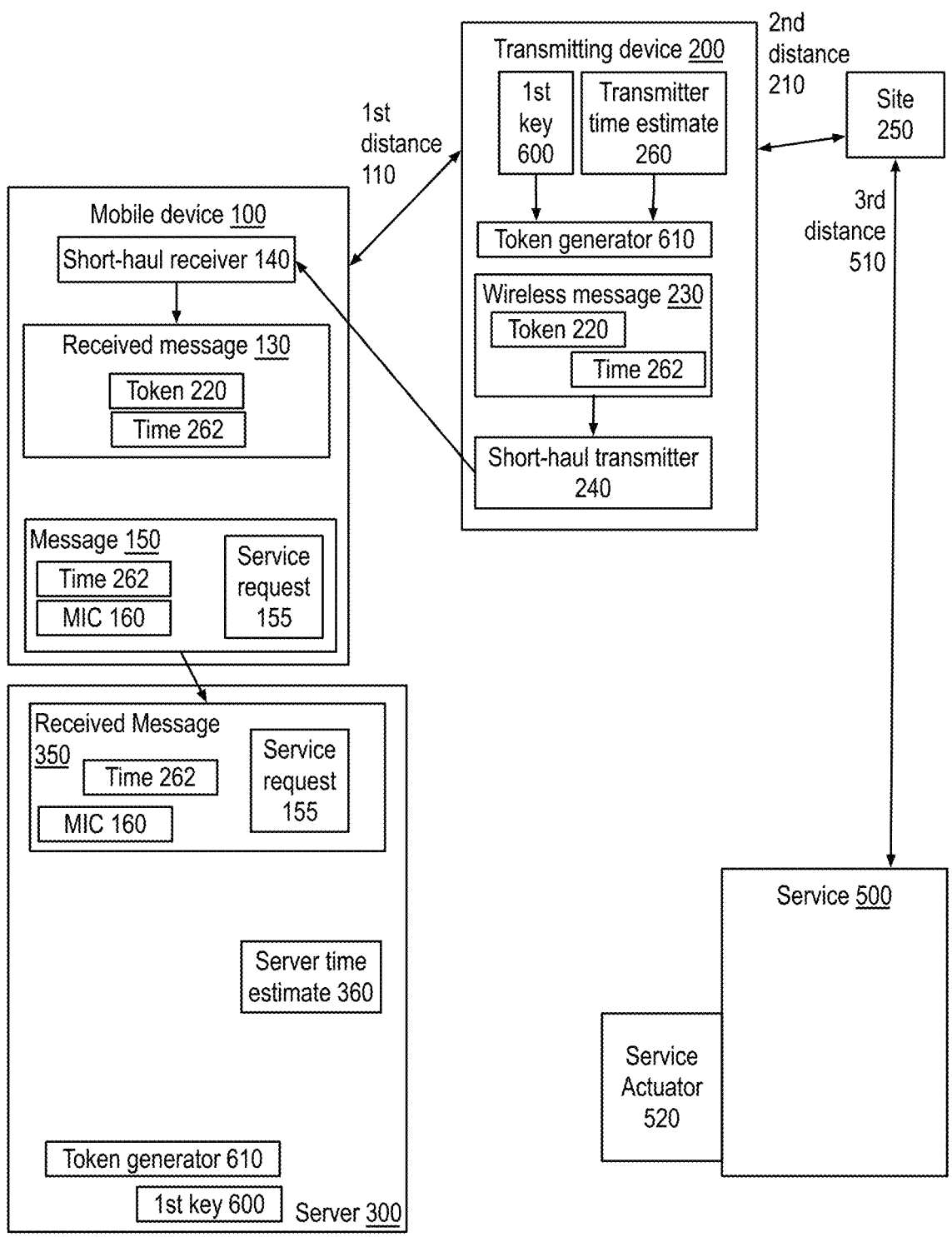
Figure 17:
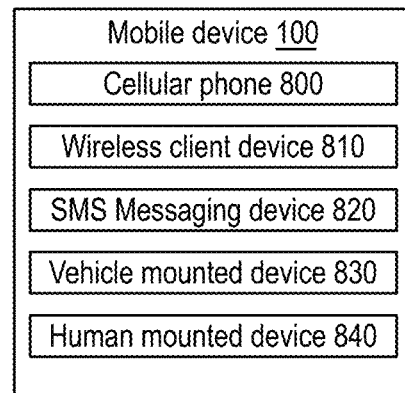
FIG. 17 shows some examples of the mobile device implementation.

FIG. 8 shows a progression from FIG. 7 wherein the mobile device 100 sends the message 150 to the server 300. The server 300 responds by generating the received message 350 which includes the transmitter time component 262, the server request 155 and the MIC 160. Also shown is the server 300 containing a server time estimate 360. There are several points which should be noted about this drawing:

Sending the message 150 from mobile device 100 to the server 300 may involve multiple physical transport layer traversals. For example, suppose the mobile device 100 implements a cellular phone 800 as shown in FIG. 17. It is quite possible that the mobile device 100 sending the message 150 may first traverse a wireless physical transport to a cellular base station and/or to a wireless hot spot of some sort. Subsequently, the message 150 may traverse a wireline physical transport, such as a fiber optic network to reach the server 300.

Figure 18:
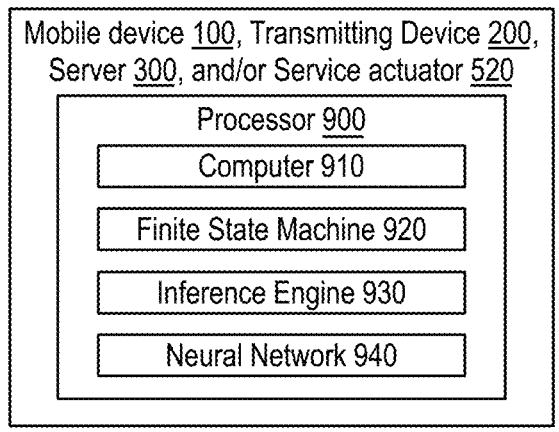
FIG. 18 shows that the mobile device, the transmitting device, the server and/or the service actuator of previous drawings may include one or more processors engaged to implement at least part of the apparatus as disclosed and/or claimed herein.

The received message 350 and the server time estimate 360 may have no inherent time order to their generation. For example, suppose the server 300 includes a processor 900 as shown in FIG. 18. Further suppose the processor 900 includes at least one computer 910. It is common for computers 910 to operate a real-time operating system which may collect events such as the reception of the received message 350 and the generation of the server time estimate 360. A task and/or a task thread may be queued for execution when both of these events are present, which can lead to the activities in the server 300 shown in FIG. 9.

Figure 9:
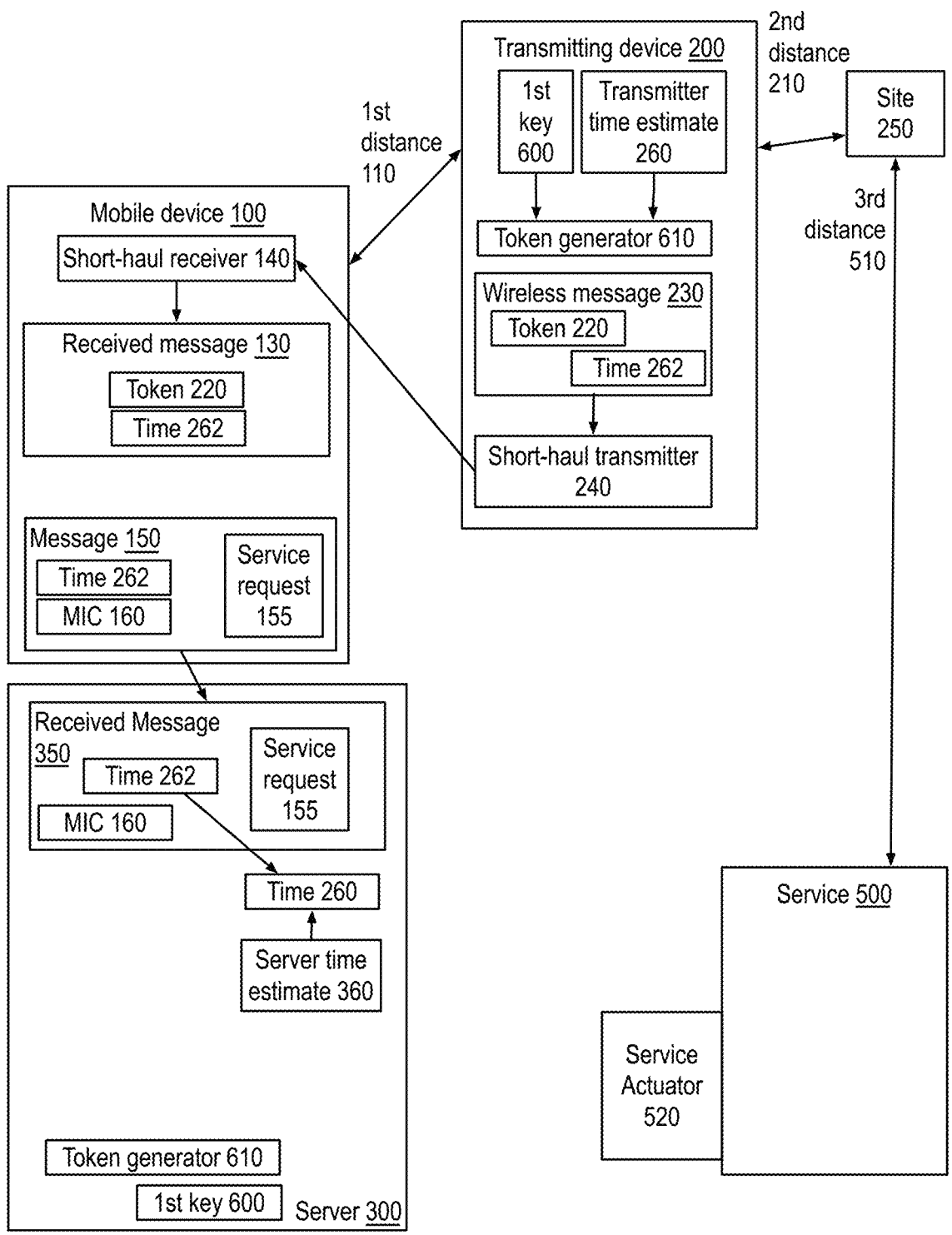

FIG. 9 shows a progression from FIG. 8, wherein the server 300 reconstructs the transmitter time estimate 260 first shown in FIG. 4. The server 300 may generate the transmitter time estimate 260 in response to the transmitter time component 262 and the server time estimate 360. There are some things to note.

The server time estimate 360 and the transmitter time estimate may be measured in the same time units or different time units. For example, the server time estimate 360 may be measured in units of a microsecond whereas the transmitter time estimate 260 may be measured in units of a milli-second. Alternatively, both may be measured in units of a milli-second.

While in a simplified environment, assuming the same time units, the generation of the transmitter time estimate 260 may be a form of adjustment of the server time estimate 360 to the closest time compatible the transmitter time component 262. For instance, one or more of the formats may be a form of fixed point numbers and/or floating point numbers.

Figure 10:
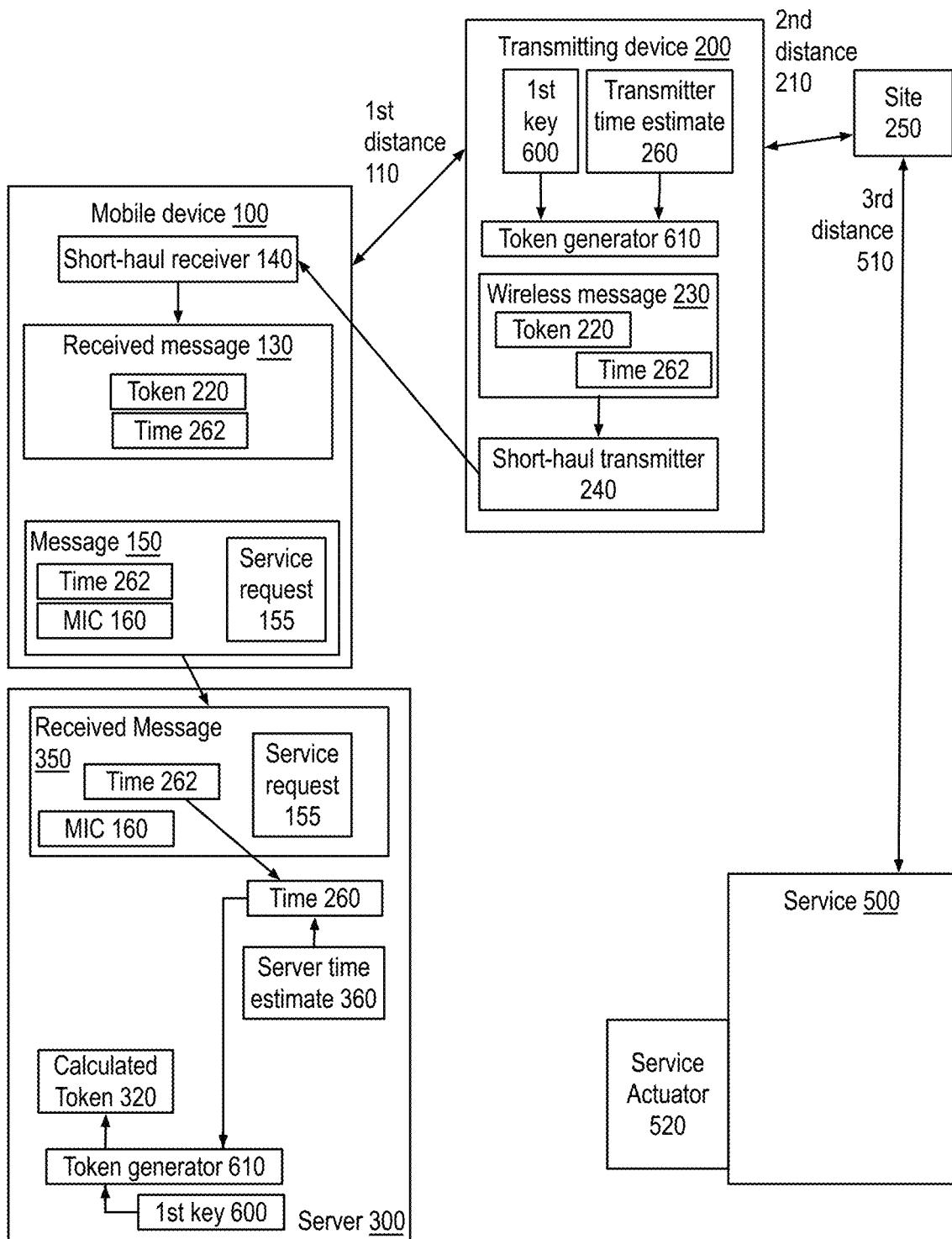

FIG. 10 shows a progression from FIG. 9 wherein the server responds to the generation of the transmitter time estimate 260 by using the transmitter time estimate 260 and the first key 600 to stimulate the token generator 610 to generate the calculated token 320.

Figure 11:
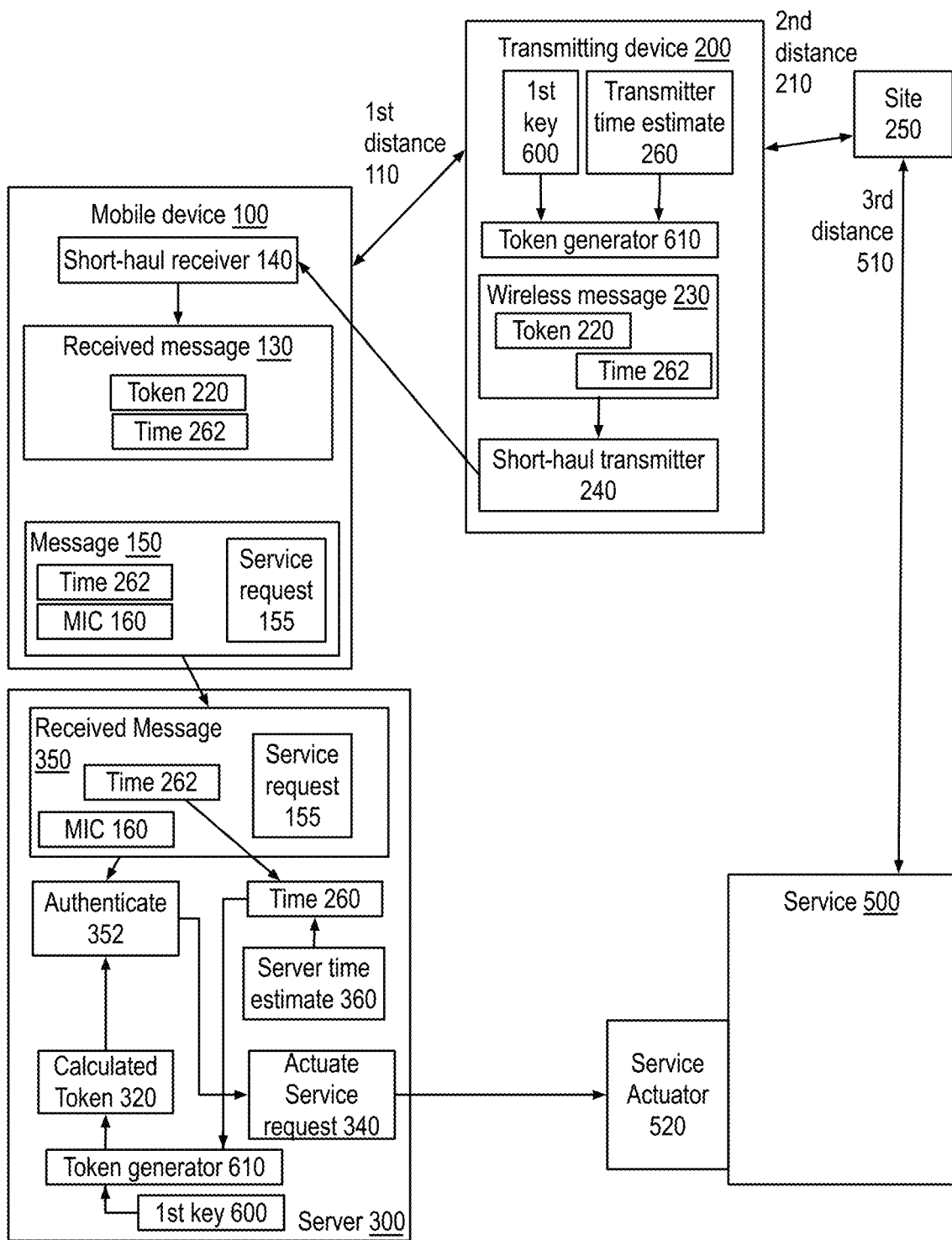

FIG. 11 shows a progression from FIG. 10 wherein if the calculated token 320 is essentially the same as the token 220, then the received message 350's payload containing the transmitter time component 262, the Message Integrity Check (MIC) 160, the service request 155 and the calculated token 320 lead the server 300 to authenticate 352 the received message 350. The server 300 further responds by actuating 340 the server request 155, thereby stimulating the service actuator 520 to perform the service 500 near (within the third distance 510) of the site 250.

Figure 12A:
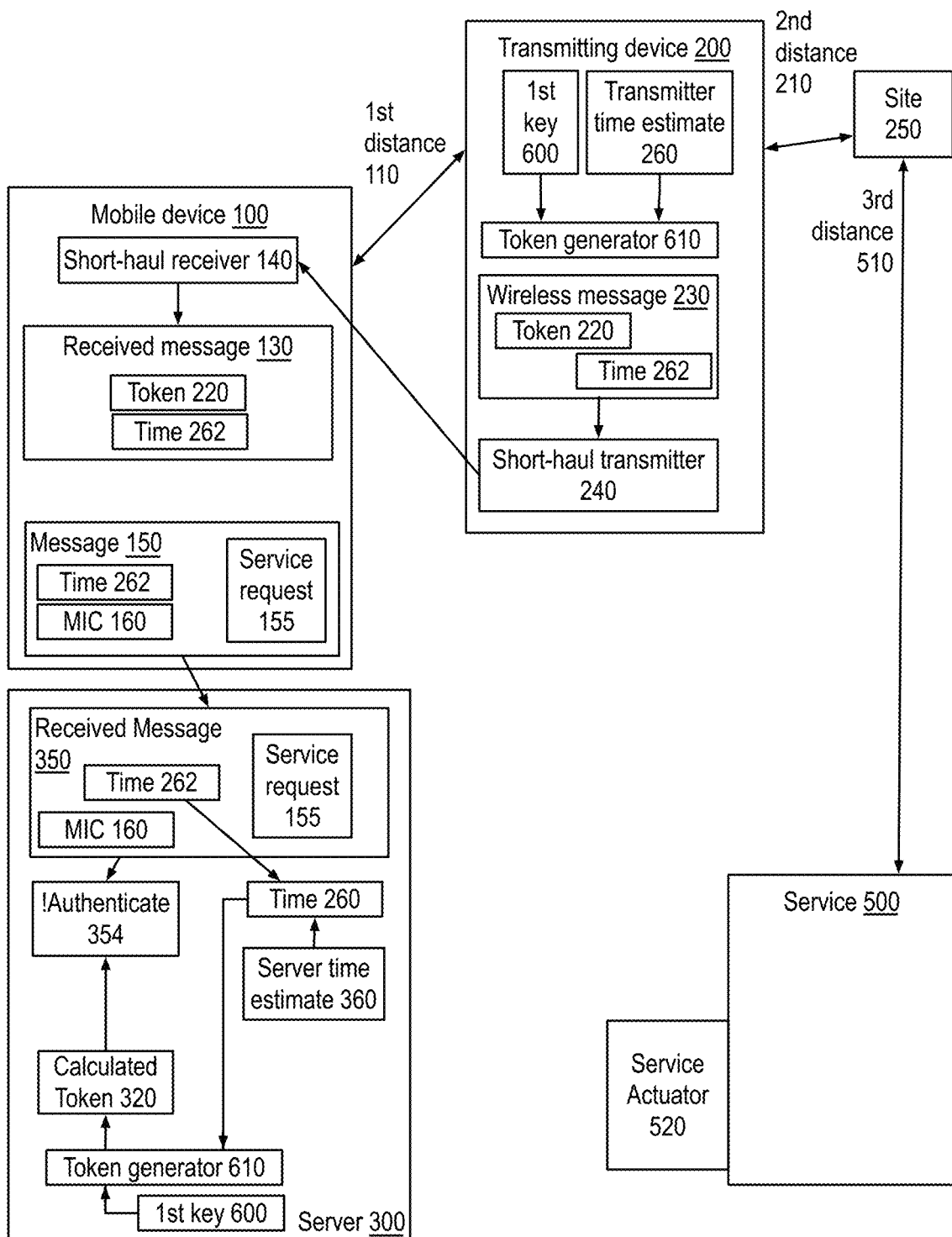

FIG. 12A shows a second progression from FIG. 10, in which the previously discussed data payload components of the received message 350 and the calculated token 320 are not essentially the same as the token 220. In this situation the server 300 does not authenticate 354 the received message 350. For example, suppose a bad actor wants to spoof lots of bicycles as in FIG. 1A, by using old tokens or fabricating fake tokens 220 in multiple mobile devices 100. The received messages will fail to authenticate 354.

Figure 12B:
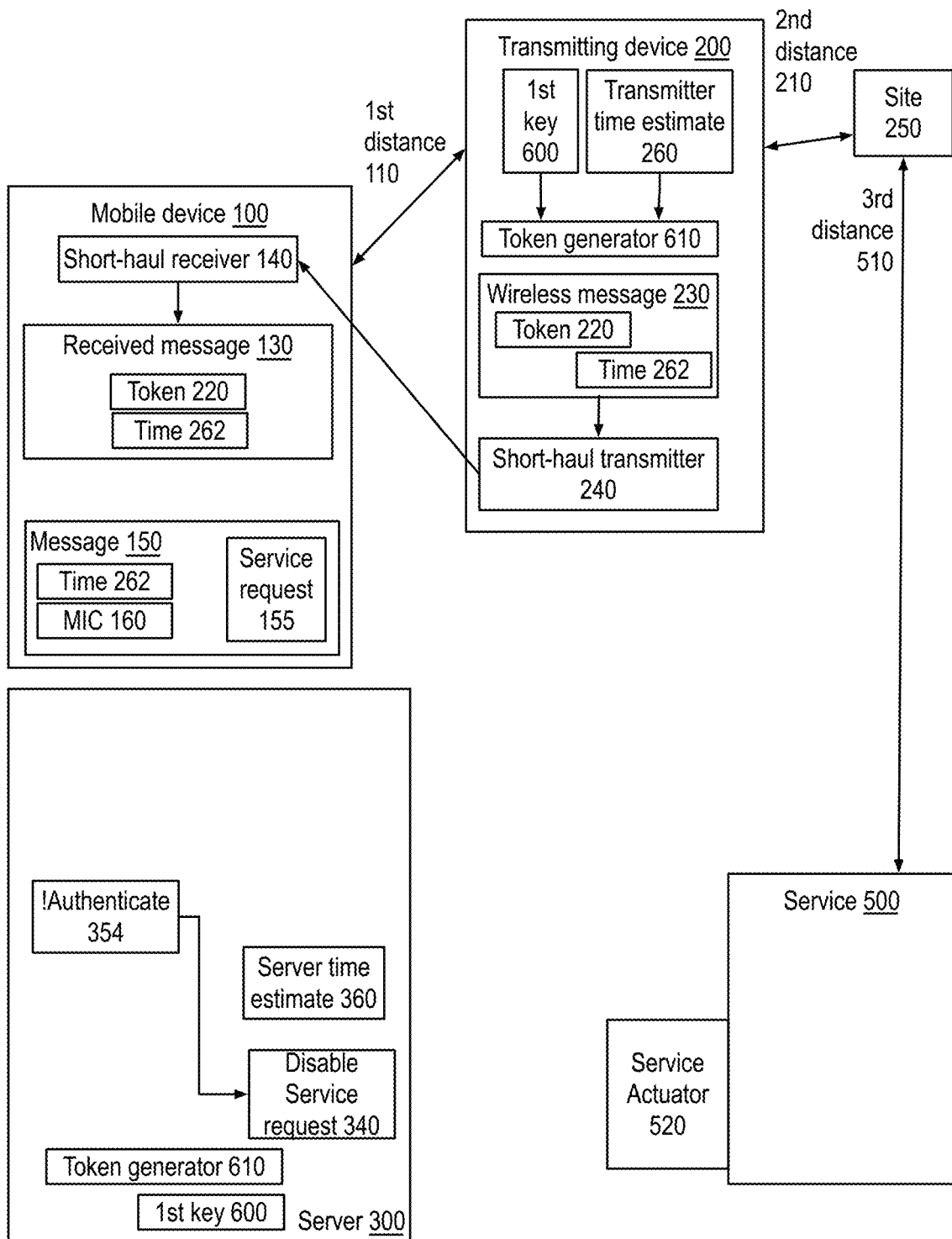

FIG. 12B shows a progression of FIG. 12A wherein the server 300 responds to the received message of FIG. 12A not being authenticated 354 by generating a disable service request 340, which may include but is not limited to, removing the received message 350 and/or removing the transmitter time estimate 260 and/or removing the calculated token 320, each shown in FIG. 12A.

FIG. 13 shows a first example of distributing the first key 600 to the transmitting device 200 and the server 300 by a virtual private network 650, to which the mobile device is not a member, and therefore cannot sniff the first key 600.

FIG. 14A, FIG. 14B, FIG. 14C and FIG. 14D show an example of the Diffie Hellman key exchange to generate the first key 600 without the first key being visible on any connection to the mobile device 100. This discussion will focus on the use of numbers n and G. n is often a prime and G is a second, large prime, possibly of more than 100 bytes in length. In some other, implementations n and G are groups. While these group implementations are well understood, they are less transparent and are left to the literature of those of common skill in the art.

FIG. 14A shows the mobile device 100, the transmitting device 200 and the server 300 all connected by an insecure network, where the mobile device 100 can sniff the communications between the transmitting device 200 and the server 300. In this situation, the generator G and the base n are distributed to each of the mobile device 100, the transmitting device 200, and the server 300. The transmitting device generates a local key a, which is not visible on the insecure network. The server 300 generates a local key b, which is also not visible on the insecure network. The transmitting device 200 generate the public key n^a, which is the large number n raised to the power a, modulo G. x modulo G is the remainder resulting from dividing x by G.

Figure 14B:
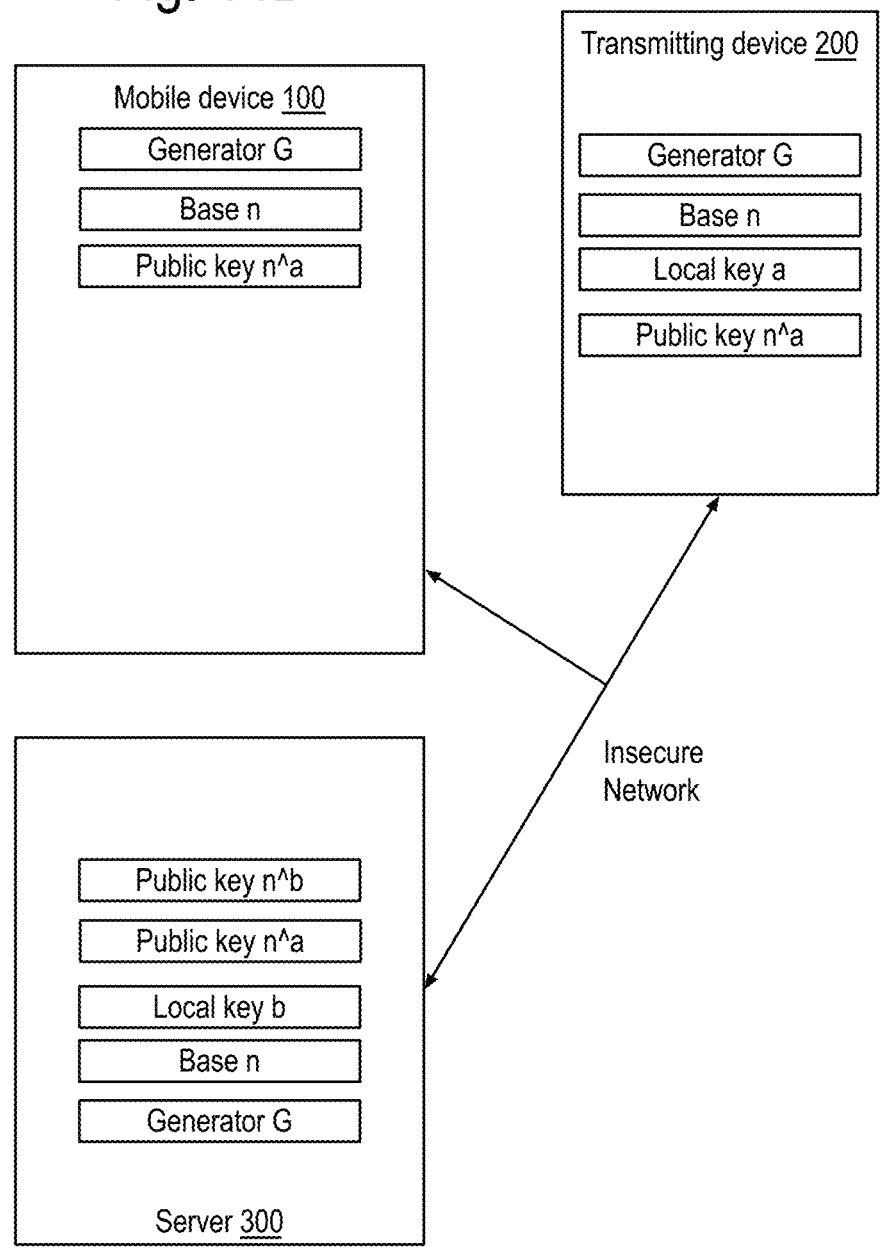

FIG. 14B shows the result of the transmitting device 200 in FIG. 14A sending the public key n^a across the insecure network, so that it is now available at the mobile device 100 and the server 300. The server 300 generates the public key n^b, by performing n^b modulo G.

Figure 14C:
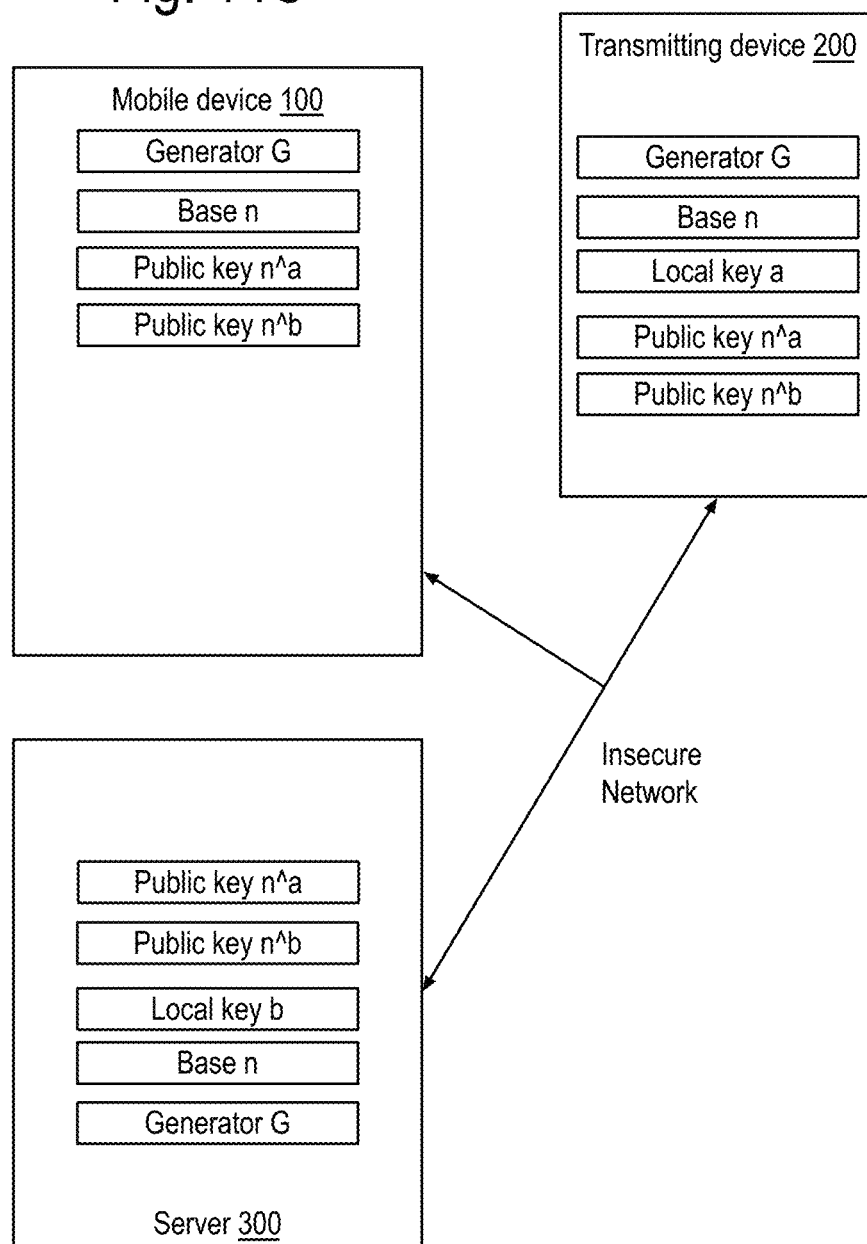

FIG. 14C shows the results of distributing the public key n^b to the transmitting device 200 and the mobile device 100, which both now include the public key n^b.

FIG. 14D shows the magic of mathematics in our time. The transmitting device generates the first key 600 by computing (n^b)^a modulo G, from the received public key n^b, because (n^b)^a=n^(b*a)=n^(a*b). The server 300 calculates the first key 600 by computing (n^a)^b modulo G, from the received public key n^a, because (n^a)^b=n^(a*b). However, the mobile device 100 cannot generate the first key 600 without solving the discrete logarithm problem, which is very computationally expensive, making the first key 600 invisible to the mobile device 100.

This cryptographic key exchange was named after Whitfield Diffie and Martin Hellman for their work in the late 1970's.

FIG. 15 shows the short haul receiver 140 included in the mobile device 100 and the short haul transmitter 240 included in the transmitting device 100 of previous drawings to be compliant with a short-haul wireless protocol 700.

FIG. 16A shows some examples of short-haul wireless communications protocols 700, which may include, but are not limited to Bluetooth® 710, Cellular V2X (C−V2X) 730, and Dedicated short-range communications (DSRC) 740.

Note that one or more of these short-haul wireless communications protocols may require a version number(s).

FIG. 16B shows some examples of versions of the Bluetooth 710 which may include but are not limited to Bluetooth 4.0 712, Bluetooth 4.1 714, Bluetooth 4.2 716, Bluetooth 5.0 718, Bluetooth 5.1 720, Bluetooth 5.2 722 and Bluetooth x.y 724, where x is at least 4 and y is at least 0. Note that Bluetooth 4.0 is essentially the same as Bluetooth 4, Bluetooth 5.0 is essentially the same as Bluetooth 5, and so on.

One skilled in the art will recognize that since Bluetooth 4.0, the Bluetooth wireless protocol has incorporated a form of message sometimes referred to as an advertisement which is broadcast by a transmitting device 200 and received by a mobile device 100 without any connection dialog between these two devices. As such, the advertisement messages can be generated as the wireless message 230 including the token 220. Parsing the wireless message 130 may involve calculating a signature, which may be used by the mobile device 100 to authenticate the token 220 generated by the transmitting device 200.

Further, communications between the mobile device 100 and the server 300 may employ an encryption mechanism and/or a second shared key to provide secure communications between the mobile device 100 and the server 300. Alternatively, rather than additional encryption, a signature may be incorporated in message 150, which may be used by the server 300 to authenticate the received message 350. In some situations, the signature may be based upon the token 220 in such a way that the token 220 itself may not be derived.

FIG. 17 shows some examples of the mobile device 100 implementing one or more of the following: a cellular phone 800, a wireless client device 810, an SMS messaging device 820, a vehicle mounted device 830 and/or a human mounted device 840. For example, a wireless client device 810 may be a tablet computer and/or a notebook computer. A vehicle mounted device 830 may be mounted on or in a covered vehicle and/or a bicycle, which may further provide Global Positioning Service (GPS) based navigation assistance. A human mounted device may be wrist mounted somewhat similar to a watch, forearm or arm mounted, possibly providing a small keypad. The human mounted device may also be worn about the neck, somewhat like a necklace.

FIG. 18 shows that the mobile device 100, the transmitting device 200, the server 300 and/or the service actuator 520 of previous drawings may include one or more processors 900 engaged to implement at least part of the apparatus as disclosed and/or claimed herein. Each processor 900 may include at least one instance of a computer 910, a Finite State Machine 920, an Inference Engine 930 and/or a Neural Network 940.

As used herein, a computer 910 includes at least one data processor and at least one instruction processor, wherein the data processor is instructed by at least one of the instruction processors.

As used herein, the Finite State Machine 920 receives at least one input signal, maintains at least one state and generates at least one output signal based upon the value of at least one of the input signals and/or at least one of the states.

As used herein, the Inferential Engine 930 includes at least one inferential rule and maintains at least one fact based upon at least one inference derived from at least one of the inference rules and factual stimulus and generates at least one output based upon the facts.

As used herein, the Neural Network 940 maintains at list of synapses, each with at least one synaptic state and a list of neural connections between the synapses. The Neural Network 940 may respond to stimulus of one or more of the synapses by transfers through the neural connections that in turn may alter the synaptic states of some of the synapses.

FIG. 19 shows the solution to the technical problem discussed regarding FIG. 1A and FIG. 1B. Recall the technical problem involved:

A parade is scheduled to proceed across multiple lanes of a roadway and approaches an intersection. Suppose some bad actor wants to slow down the parade by impersonating bicyclists waiting at the intersection as shown in FIG. 1A, through the abuse of several cell phones operating traffic applications intended to recognize the cell phone users as bicyclists at the intersection. If the traffic control system cannot tell if the cell phones are actually there as revealed in FIG. 1B, the parade may be disrupted.

The solution of this technical problem is for the only real bicyclist to equip her mobile device 100 with the disclosed and claimed technology so that as the mobile device 100 is near enough to the site 250, their request is acknowledged, but the far larger parade is handled first. All of the spoofed devices, and their requests, are not acknowledged. So that the parade is not disrupted.

FIG. 20 shows the solution to the technical problem discussed regarding FIG. 2A and FIG. 2B. Recall the technical problem involved:

It is an end of shift time for workers, more generally, people on an upper floor in a high-rise building shown in FIG. 2A. A bad actor wants to slow or impede the workers going off-shift through the abuse of cell phones requesting elevator service between lower floors as revealed in FIG. 2B. These fake requests may slow down and impede the going-off-shift workers from leaving the high-rise building. Worse yet, the fake requests could potentially flood the server 300, potentially causing it to malfunction. To avoid this further technical problem, the server 300 needs to remove the fake requests from its pending request queue(s) as shown in FIG. 2B.

FIG. 20 shows the solution of this technical problem, where the real person, equipped with a mobile device 100 can request the elevator, but the other spoofed requests are ignored. As shown and discussed FIG. 12B above, the false service requests are disabled and removed from the server 300.

Figure 2C:
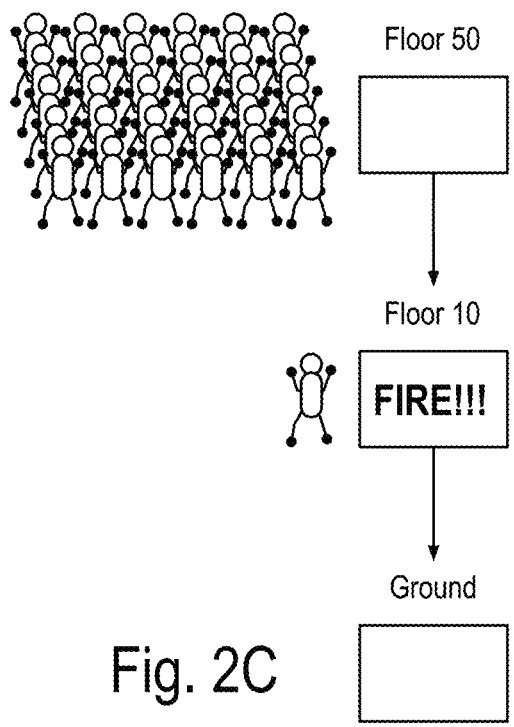
FIG. 2C and FIG. 2D show an example of people requesting elevator service from the 50$^{th}$ floor of a high-rise building, which a bad actor may delay and/or disrupt by spoofing a fire alert on a lower floor.
Figure 2D:
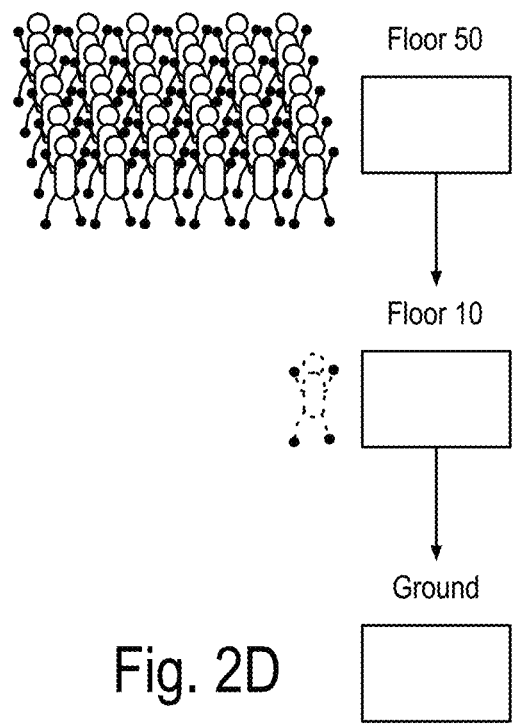
Figure 2E:
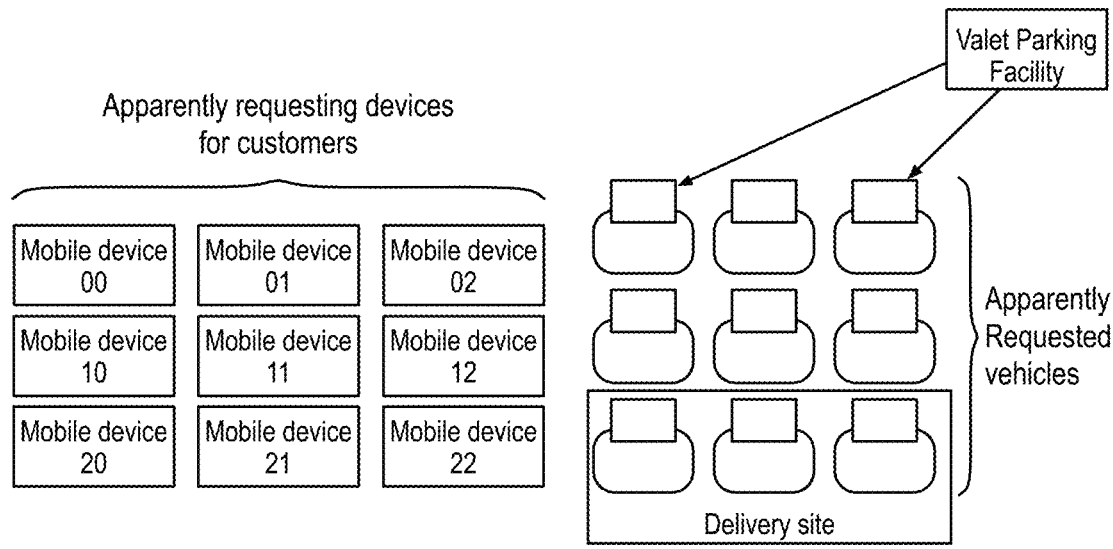
FIG. 2E and FIG. 2F show an example of mobile devices being used to spoof a large number of requests to a valet parking facility which clog the delivery site, where actually the number of requests is much smaller and do not clog the delivery site.
Figure 2F:
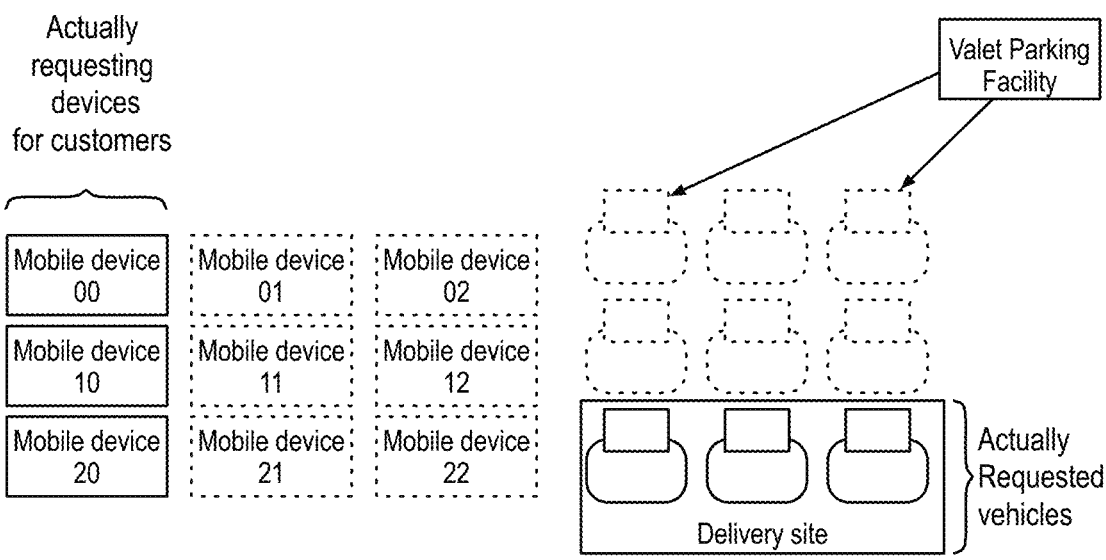
Figure 21:
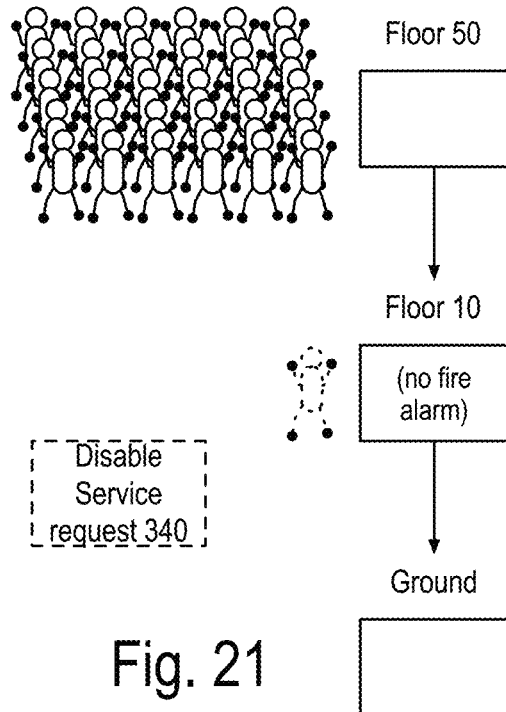
FIG. 21 shows the solution to the technical problem discussed regarding FIG. 2C and FIG. 2D.

FIG. 21 shows the solution to the technical problem discussed regarding FIG. 2C and FIG. 2D. Recall the technical problem involved:

Suppose a bad actor operates a mobile device to initiate a fire alert on a lower floor while the (people) on an upper floor are leaving the building as shown in FIG. 2D. This could include impersonation of a mobile device associated with a security person for the building, giving the impression shown in FIG. 2C of an actual fire alert. These disruptive steps could have a large effect on multiple individuals and businesses in and around the building, as well as first responders and other emergency personnel.

The solution to this technical problem is the bad actor controlled mobile device does not have a mobile device 100 as disclosed herein, consequently, as discussed and shown in FIG. 12B, the false service requests are disabled and removed from the server 300.

Figure 22:
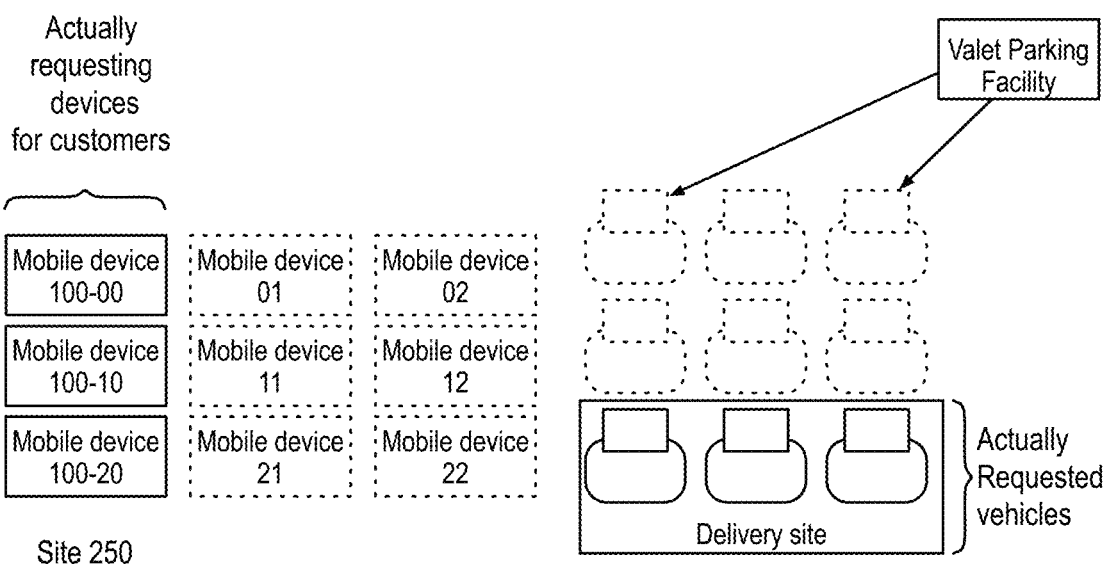
FIG. 22 shows the solution to the technical problem discussed regarding FIG. 2E and FIG. 2F.

FIG. 22 shows the solution to the technical problem discussed regarding FIG. 2E and FIG. 2F. Recall the technical problem involved:

The customers of a valet parking facility can request their cars through an application on their mobile devices. Suppose a bad actor impersonates a large number of these customer mobile devices, requesting that their vehicles be made ready for their use, overwhelming the valet service mechanism's ability to recognize and service the actual customer requests as shown in FIG. 2E. FIG. 2F shows the actual situation, which many fewer requests are being made and the delivered vehicles do not overwhelm the delivery site.

The solution to this technical problem is that only the actually requesting mobile devices 100-00, 100-10 and 100-20, can trigger activation of their requests near the site 250 as shown and discussed above in FIG. 3 to FIG. 12A. As a consequence, only the actually requested vehicles are in the delivery site for these customers, and the delivery site is unlikely to be overwhelmed.

What is claimed is:

1. An apparatus, comprising:

Au1) a mobile device, a transmitting device located near a site, and a server, wherein said transmitting device and said server share a first key invisible to said mobile device, implementing the following to thwart deception of said server that said mobile device is near said transmitting device;

Au1a) said apparatus operates without using a signal strength of a wireless message between said mobile device and said transmitting device to determine a first distance between said mobile device and said transmitting device;

Bu1) said mobile device adapted and configured to receive said wireless message containing a token using a short-haul wireless communication protocol from said transmitting device located within a short range of said mobile device;

Cu1) said transmitting device adapted and configured to generate said token using a token generator using a first key in said wireless message and to transmit said wireless message via said short-haul wireless communication protocol to said mobile device;

Du1) said mobile device responds to said wireless message by parsing said wireless message to generate said token without wirelessly communicating to said transmitting device;

Eu1) said server receives a service request from said mobile device to perform a service at said site;

Fu1) said mobile device sends a second wireless message to said server including a form of said token to confirm said mobile device is near said site; wherein said server generates a server time estimate corresponding to a transmitter time estimate when said transmitting device generated said token;

Gu1) said server responds to said second wireless message received from said mobile device as a received message by determining if said form of said token proves said mobile device is near said site based upon said first key shared with said transmitting device and said first key is invisible to said mobile device; and Hu1) said server authorizes said service at said site if said form of said token proves said mobile device is within said first distance of said transmitting device.

2. The apparatus of claim 1, wherein said server disables said service request if said form of said token proves said mobile device is not within said first distance of said transmitting device.

3. The apparatus of claim 2, wherein said server disables said service request by said server removing at least one of, said message and said service request, from said server.

4. The apparatus of claim 1, further comprising:
Au4) wherein said message includes at least part of a mobile time estimate generated by said mobile device.

5. The apparatus of claim 4, further comprising at least one of:
Au5) wherein said server authorizes said service at said site in response to said server proving said mobile device is within said first distance near said server time estimate based upon said received message;
Bu5) wherein said server disables said service request in response to said server proving said mobile device is not within said first distance near said server time estimate based upon said received message.

6. The apparatus of claim 1, further comprising at least one of
Au6) wherein said mobile device implements at least one member of a first group consisting of a cellular phone, a wireless client device, a SMS messaging device, a vehicle mounted device and a human mounted device; and
Bu6) wherein said short-haul wireless communication protocol includes at least one version of at least one member of a protocol group consisting of Bluetooth®, Dedicated short-range communications (DSRC), and Cellular V2X (C–V2X).

7. The apparatus of claim 6, wherein said short-haul wireless communications protocol includes said version of said Bluetooth at no less than version 4.0.

8. The apparatus of claim 1, further comprising at least one of
Au8) wherein said short range is not more than a member of the group consisting of 10 meters (10 m), 50 m and 100 m; and
Bu8) wherein a second distance between said transmitting device and said site, is not more than a member of a second group consisting of 1 meter (1 m), 3 m, and 5 m.

9. The apparatus of claim 1, wherein said first key is shared between said server and said transmitting device using at least one of:
Au9) a Virtual Private Network (VPN) connection and
Bu9) a Diffie Hellman key exchange to generate said first key without said first key being visible on any connection to said mobile device.

10. The apparatus of claim 1, further comprising:
Av11) a traffic control system adapted to regulate traffic crossing an intersection as said service at said site between at least two roadways, each adapted for vehicle and/or human traffic across said intersection;
Bv11) wherein at least some of said vehicles and/or at least some of said humans are equipped with said mobile device.

11. The apparatus of claim 1, further comprising:
Av12) an elevator providing said service at said site on at least two floors for transferring at least one worker between said at least two floors and said elevator;
Bv12) wherein said at least one of said workers carries said mobile device.

12. The apparatus of claim 1, further comprising:
Av13) a fire alarm as said site on each of at least two floors of a building providing said service of issuing a fire alert on a one of said at least two of said floors in response to a person triggering said fire alarm;
Bv13) wherein said person carries said mobile device.

13. The apparatus of claim 1, further comprising:
Av14) a valet parking facility providing said service as delivery of a vehicle for a customer operating said mobile device near said site.

14. The apparatus of claim 1, further comprising at least one of:
Av11) a traffic control system adapted to regulate traffic crossing an intersection as said service at a first of said site between at least two roadways, each adapted for vehicle and/or human traffic across said intersection;
Av12) an elevator providing said service at a second of said site on at least two floors of transferring at least one worker between said floor and said elevator;
Av13) a fire alarm as a third of said site on each of at least two floors of a building providing said service of issuing a fire alert on said floor in response to a person triggering said fire alarm; and
Av14) a valet parking facility providing said service as delivery of a vehicle for a customer operating said mobile device near a fourth of said site;
Bv11) wherein at least some of said vehicles and/or at least some of said humans are equipped with said mobile device;
Bv12) wherein at least some of said workers carry said mobile device; and
Bv13) wherein said person carries said mobile device.

15. The apparatus of claim 1, wherein to thwart said deception of said server acts to thwart a location based denial of service which would deceive said server.

* * * * *